United States Patent [19]
Ooi et al.

[11] Patent Number: 5,805,321
[45] Date of Patent: Sep. 8, 1998

[54] CONTROL UNIT FOR OPTICAL MODULATORS PRODUCING MULTIPLEXED OPTICAL OUTPUT SIGNAL

[75] Inventors: Hiroki Ooi; George Ishikawa; Hiroshi Nishimoto, all of Kawasaki, Japan

[73] Assignee: Fujitsu Limited, Kanagawa, Japan

[21] Appl. No.: 712,375

[22] Filed: Sep. 11, 1996

[30] Foreign Application Priority Data

Sep. 11, 1995 [JP] Japan ................................. 7-232626

[51] Int. Cl.$^6$ .............................. H04J 14/08; H04J 14/02
[52] U.S. Cl. .................... 359/135; 359/124; 359/161; 359/181
[58] Field of Search ..................... 359/124, 133, 359/135, 156, 161, 180, 181, 187

[56] References Cited

U.S. PATENT DOCUMENTS 5,170,274  12/1992  Kuwata et al. ........................ 359/182
5,394,261  2/1995  Nakamura ............................. 359/180
5,491,576  2/1996  Bergano ............................... 359/187

FOREIGN PATENT DOCUMENTS 2167524  6/1990  Japan .

Primary Examiner—Kinfe-Michael Negash
Attorney, Agent, or Firm—Helfgott & Karas, P.C.

[57] ABSTRACT

A control unit for controlling an optically modulating apparatus in an optical transmitter, including plural optical modulators producing an optical output signal consisting of a series of optical pulses for transmitting data under OTDM or WDM, so that pre-chirping magnitudes of the modulators are changed together with drift compensation, for preventing waveform deterioration due to an optical transmission line from occurring. The pre-chirping magnitudes are changed by shifting operating points of modulators only concerning pre-chirping, without affecting other transmitting characteristics of the optical output signal.

11 Claims, 20 Drawing Sheets

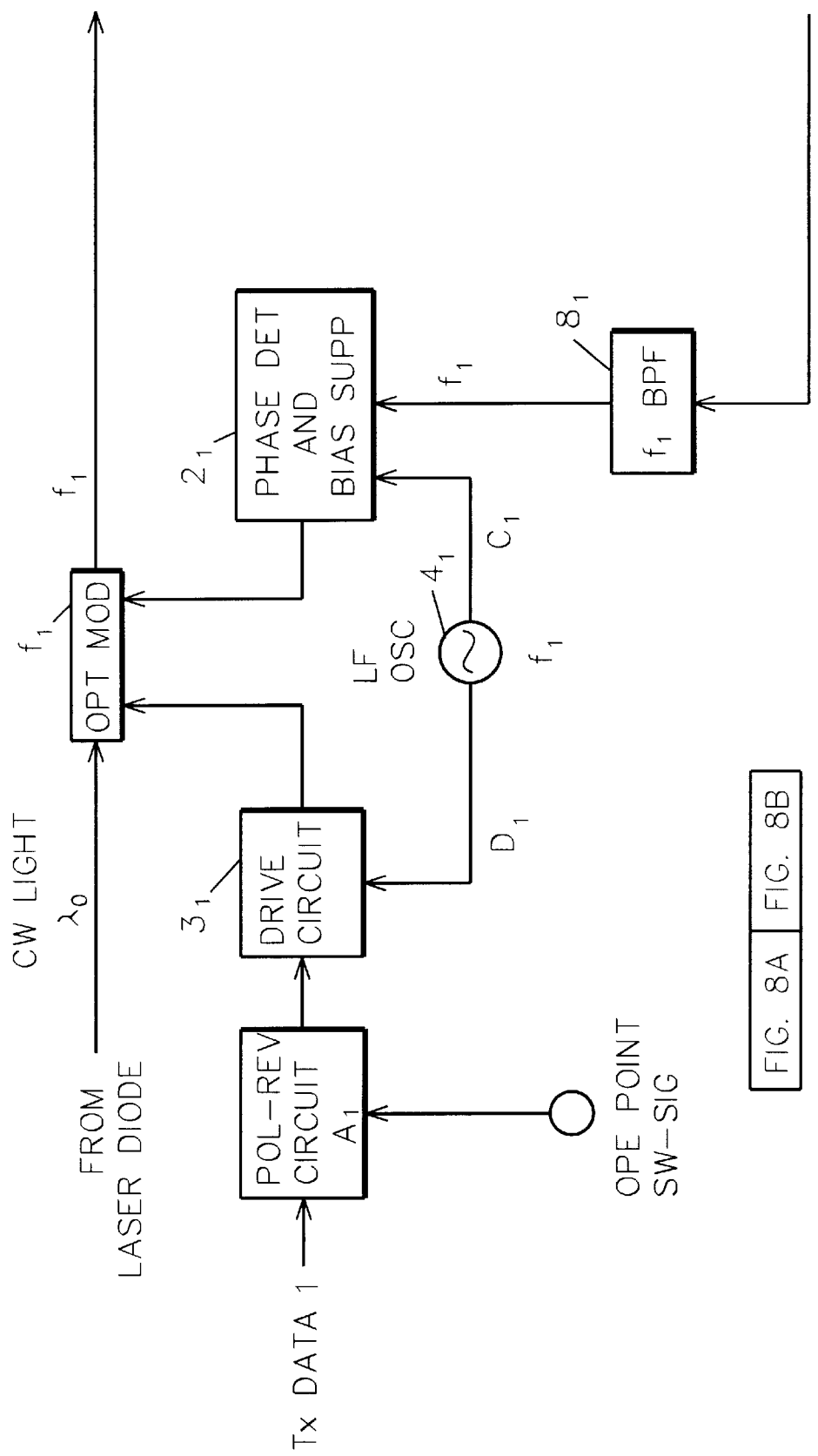

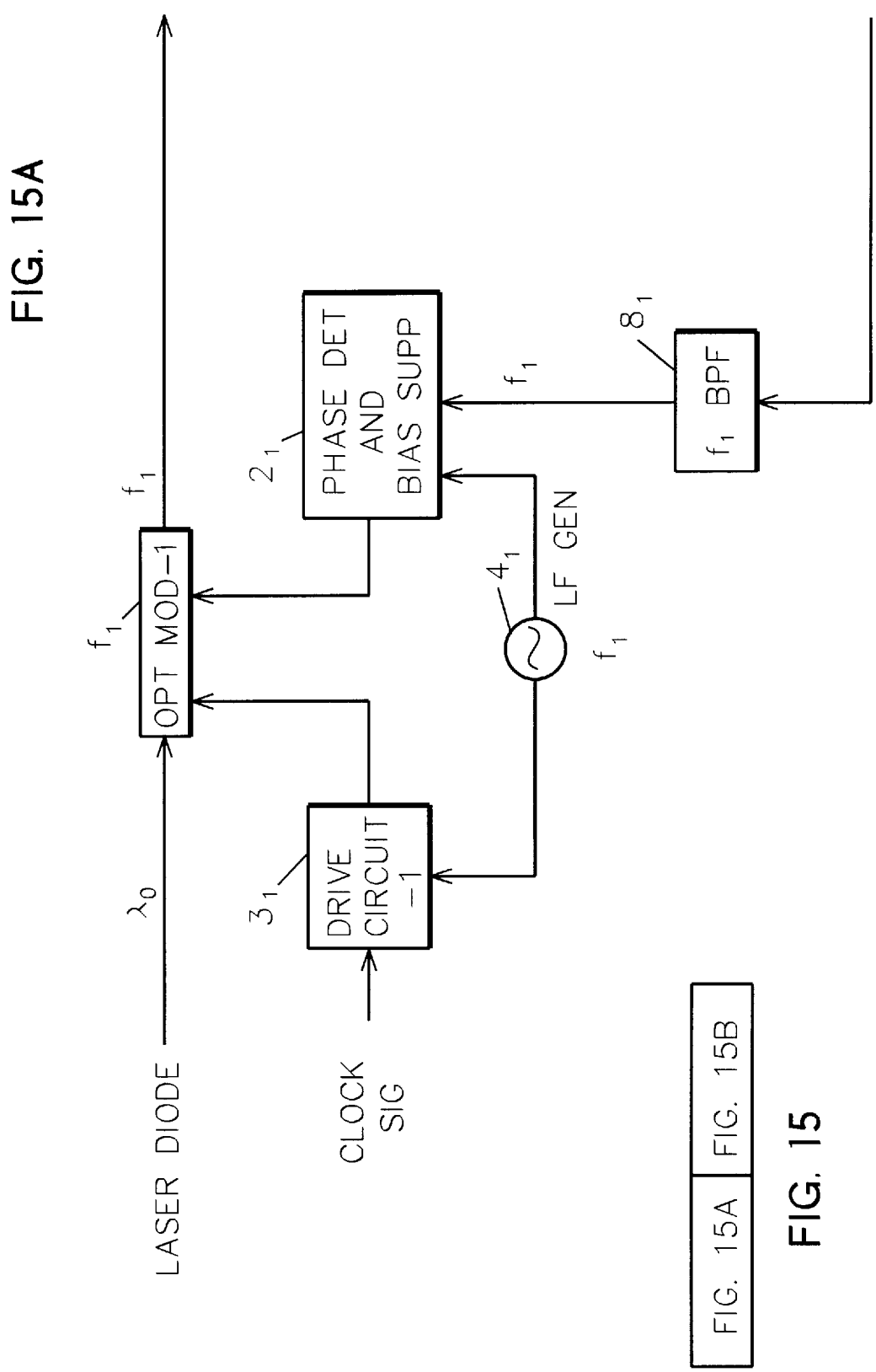

FIG. 16A | FIG. 16B

CONTROL UNIT FOR OPTICAL MODULATORS PRODUCING MULTIPLEXED OPTICAL OUTPUT SIGNAL

BACKGROUND OF THE INVENTION

Field of the Invention

The present invention relates to an optical data transmitter for an optical data transmission system. In particular, the present invention relates to a control unit for allowing optical modulators in the optical transmitter to transmit a high speed multiplexed optical output signal using multiplexing techniques such as an optical time-division multiplexing technique (OTDM) and an optical wavelength-division mutiplexing technique (WDM).

In recent years, a large-capacity of information has been required to be transmitted through optical transmission system. At the present time, an optical transmission system having a data transmission speed as high as 10 Gb/s (gigabits/second) has been realized.

In such an optical transmission system, a pre-chirping technique is applied to the optical modulator for preventing optical pulse deterioration occurring due to the transmission characteristics of the transmission line of the optical transmission system. The pre-chirping technique is applied to the optical transmitter by previously changing an optical wavelengths in the optical output signal produced at the optical transmitter.

In the optical transmitter, a modulated optical output, which will be simply called "optical output" hereinafter, is produced by modulating laser light with a driving electric data signal, which will be called simply "driving signal" hereinafter, at the optical modulator. Formerly, a high speed optical transmission system was realized by increasing the speed of the driving signal. However, the speed of the driving signal has its limit technically. In order to overcome the limit, an optical multiplexing technique such as OTDM or WDM is utilized instead of increasing the speed of the driving signal. The optical multiplexing technique is useful for increasing the capacity of information transmitted through the optical transmission system.

In either OTDM or WDM, a plurality of optical modulators are necessary for the optical transmitter. FIG. 1 shows an example of an optically modulating apparatus including two optical modulators operating under OTDM, and FIG. 2 is a time-chart for illustrating waveforms of light (LIGHT), a clock diving signal (CLOCK DRIV SIG), optical clock pulses (OPT CLOCK PULSEs), driving data signals (DRIV DATA SIG), modulated optical output (OPT OUTPUT) and an optical output signal (OPT OUTPUT SIG). The waveforms are designated by reference signs, "a" to "i" respectively in FIG. 1.

The optically modulating apparatus shown in FIG. 1 is disclosed in Japanese Laid-open Patent Application No. 2-167524. According to this Patent Application, the optically modulating apparatus consists of the following units: a laser diode (LD) (31) which is a light source for generating CW (continuous-wave) light (LIGHT) "a" (as shown in FIG. 2A); an optical modulator (OPT MOD) (32) for modulating the light "a" into a pair of optical clock pulses (OPT CLOCK PULSEs) "c and d" (FIGS. 2C and 2D) with a B/2 GHz clock driving signal (CLOCK DRIVE SIG) "b" (FIG. 2B), wherein the phases of the OPT CLOCK PULSEs c and d are opposite from each other as shown in FIGS. 2C and 2D and B Gb/s is a bit rate of a time-divisionally multiplexed optical output signal finally transmitted through an optical transmission line of an optical transmission system; an optical modulator (OPT MOD) (33) for modulating the OPT CLOCK PULSE "c" into first optical output (OPT OUTPUT) "g" (FIG. 2G) with a first driving data signal (DATA SIG) "e" (FIG. 2E) having a bit rate of B/2 Gb/s in synchronization with the CLOCK SIG; another optical modulator (OPT MOD) (34) for modulating the other ("d") of the pair of the clock pulses into second OPT OUTPUT "h" (FIG. 2H) with a second DATA SIG "f" (FIG. 2F) having a bit rate of B/2 Gb/s in synchronization with the CLOCK SIG; and an optical beam combiner (OPT COMB) (35) for combining the first OPT OUTPUT "g" with the second OPT OUTPUT "h", producing an optical output signal (OPT OUTPUT SIG) "i" (FIG. 2I) under OTDM.

From the above description, it can be concluded that by virtue of providing the optical modulators 32, 33 and 34, the optical modulation can be performed by the driving signal at half of the data transmission rate (B Gb/s) of the optical transmission system.

In the optically modulating apparatus shown in FIG. 1, Mach-Zehnder type optical modulators are mainly used for the optical modulators 32, 33 and 34. The Mach-Zehnder type optical modulator has an advantage in that little chirping occurs in optical output. However, an disadvantage in that an operating point of the modulator can drift due to temperature change and/or time variation. In order to stabilize the operating point, a feed-back compensation circuit is adopted to the Mach-Zehnder type optical modulator.

FIG. 3 is a block diagram illustrating a Mach-Zehnder type optically modulating apparatus including the feed-back compensation circuit. The apparatus is disclosed in Japanese Laid-open Patent Application No. 3-252825.

In FIG. 3, the Mach-Zehnder type optically modulating apparatus consists of the following units: a laser diode (LD) (5) for emitting light; a Mach-Zehnder type external optical modulator (OPT MOD) (1) for modulating the light from the LD 5 into an optical output signal of the Mach-Zehnder type optically modulating apparatus with a driving signal (DRIV SIG) fed to the OPT MOD 1 through a low-frequency superposing circuit (LF SUPERPOSE) (3) whose function will be described below; and an operating point stabilizing circuit (STABILIZ CIRCUIT) (2) for stabilizing the operating point of the OPT MOD 1 whose constitution and operation will be described below.

The STABILIZ CIRCUIT 2 in FIG. 3 consists of: a beam-splitter (BEAM SPLIT) (7) for dividing the optical output signal of the OPT MOD 1; a photo diode (PD) (6) for converting the divided optical output signal into an electric signal; a signal amplifier (AMP) (24) for amplifying the converted electric signal; a low frequency oscillator (LF OSC) (4) for generating a low frequency signal at frequency $f_o$, which will be called "LF SIG ($f_o$)" hereinafter; a phase detector (PHASE DET) (21) for comparing a phase of the converted electrical signal with a phase of the LF SIG ($F_o$) and detecting the LF SIG ($f_o$) included in the optical output signal of the OPT MOD 1; a low-pass filter (LPF) (22) for making pass a low frequency part of the detected output from the PHASE DET 21; a bias supplying circuit (BIAS SUPPLY) (23) for producing a compensating bias signal from the detected output of the PHASE DET 21 passing through the LPF 22 and supplying the compensating bias signal to the OPT MOD 1; and the LF SUPERPOSE 3.

The operation of the STABILIZ CIRCUIT 2 in FIG. 3 is as described below in reference to FIG. 4.

A Mach-Zehnder type optical modulator has an optimum operating point. FIG. 4 illustrates the operating principle of bias control for the Mach-Zehnder type optical modulator.

At the optimum operating point, the Mach-Zehnder type optical modulator produces a maximum power for the optical output signal at a maximum level of a driving signal and a minimum power at a minimum level of the driving signal. Under the above condition, because of an input-output characteristic of the Mach-Zehnder type optical modulator, even though the LF SIG ($f_o$) is superposed on the driving signal (DRIV SIG), no LF SIG ($f_o$) appears in the optical output signal. However, when the operating point is drifted, the LF SIG ($f_o$) appears as an envelope of the optical output signal. That is, in FIG. 4, when the modulator operates at the optimum operating point, the input-output characteristic becomes as shown by a reference sign (a). However, when the input-output characteristic drifts because of, for example, the temperature change, the input-output characteristic becomes as shown by a reference sign (b) or (c). When the input-output characteristic becomes (b) or (c), a phase of an upper or a lower envelope of the optical output signal is reversed to a phase of an envelope of the driving signal. In other words, when the phases of upper and lower envelopes of the optical output signal are the same, the optical output includes an LF SIG ($f_o$) component. Furthermore, since the phase of the LF SIG ($f_o$) component in case of the input-output characteristic (b) differs from the phase of the LF SIG ($f_o$) component in case of the input-output characteristic (c) as much as 180°, a drift direction of the operating point can be detected by comparing the phase of LF SIG ($f_o$) component with the phase of the LF SIG of the LF OSC 4.

At PHASE DET 21 in FIG. 3, the LF SIG ($f_o$) component is detected and a phase of the detected component is compared with a phase of the LF SIG ($f_o$) sent from the LF OSC 4, producing a signal of a detected phase difference. Receiving the signal of the detected phase difference, the BIAS SUPPLY 23 produces a compensating voltage to the OPT MOD 1 so, that the drifted input-output characteristic (b) or (c) is brought back to the normal input-output characteristic (a) at the optimum operating point.

When the plural Mach-Zehnder type optical modulators are used for applying OTDM or WDM technique, the number of compensation circuits required is the as the number of the modulators, which results in increasing module size and manufacturing costs for the compensation circuits. This problem has been solved by a technique disclosed in U.S. patent application Ser. No. 510474, filed on Aug. 2, 1995 which is herein incorporated by reference. According to the patent application Ser. No. 510474, only the optical output of the last modulator is divided and monitored, and the drift compensation for all the modulators is performed simultaneously. The detail of the Patent Application is omitted to be described here.

As mentioned before, the waveform of the optical output signal deteriorates when the optical output signal is transmitted through the optical transmission line because of wavelength dispersion and non-linear effect occurring in the transmission line of the optical transmission system. In order to prevent the deterioration of the optical output signal from occurring, the pre-chirping method is applied to the optical modulator.

The pre-chirping method is a method for preventing the waveform deterioration of the transmitting optical output signal from occurring by previously providing optical wavelength (frequency) variation to the optical output of modulators, and many methods have been proposed.

When the Mach-Zehnder type optical modulator is used as an external optical modulator, a wavelength fluctuation (chirping) occurs essentially in the optical modulator. Therefore, this method uses the wavelength fluctuation as a pre-chirping method. In the Mach-Zehnder type optical modulator, there is a sine curve relation between a driving voltage for the optical modulator and the optical output power of the optical modulator, as shown in FIG. 5A. When a driving voltage is formed as a positive pulse as shown on left-hand side of FIG. 5B and is added to bias voltage $Vb_1$ (FIG. 5A) of the optical modulator, the optical output is produced in the same polarity (positive) as the polarity of the positive pulse of the driving voltage, as shown on left-hand side of FIG. 5C. At this time, the optical wavelengths are shortened at a rising part of the optical pulse and lengthened at a falling part of the optical pulse as shown on left-hand side of FIG. 5D. That is, as time passes, the optical wavelength is shifted from a short wavelength to a long wavelength in the optical pulse. This phenomenon is called "red-shift chirping".

On the other hand, when a driving voltage of a negative pulse shown on right-hand side of FIG. 5B is added to an bias voltage $Vb_2$ (FIG. 5A) of the optical modulator, the optical output is produced from the optical modulator in opposite (positive) polarity of the negative pulse of the driving voltage as shown on right-hand side of FIG. 5C. At this time, the optical wavelengths are lengthened at a rising part of the optical pulse and shortened at a falling part of the optical pulse as shown in on right-hand side of FIG. 5D. That is, as time passes, the optical wavelength is shifted from a long wavelength to a short wavelength in the optical pulse. This phenomenon is called "blue-shift chirping".

In order to represent magnitude of chirping, the following chirping parameter α is used:

$$\alpha = 2(d\phi/dt)/(1/E \cdot dE/dt),$$

wherein $\phi$: optical phase, $E$: optical intensity.

The value of α is different at the different intensity level of the optical pulse defined by this formula, and in case of the Mach-Zehnder type optical modulator, we use the value of α as an index at the half-intensity of optical on-level.

When a becomes positive (α>0), the red-shift chirping occurs, and when a becomes negative (α<0), the blue-shift chirping occurs.

When a wavelength of the optical output signal of the optically modulating apparatus is shorter than a zero-dispersion wavelength of the transmission line and a transmission condition of an optical fiber of the optical transmission line is in a region of normal dispersion (D<0), long-wavelength light is transmitted faster than short-wavelength light through the optical fiber. Therefore, if a red-shift (α>0) pre-chirping method is previously applied to the Mach-Zehnder type optical modulator, a shape of the pulse wave can be sharpened which results in preventing the deterioration of the waveform occurring after transmission.

On the contrary, when the transmission condition is in a region of abnormal dispersion (D>0), the short-wavelength light is faster than the long-wavelength light, so that the deterioration of the waveform can be prevented from occurring by previously applying blue-shift (α<0) pre-chirping method to the Mach-Zehnder type optical modulator. Therefore, a transmission condition of the optical transmission system can be brought in optimum by adjusting the magnitude of α in accordance with the transmission condition of the transmission line. In case of the Mach-Zehnder type optical modulator, the polarity of α can be changed to positive or negative by using the bias voltage of either $Vb_1$ or $Vb_2$.

The polarity (plus or minus) of pre-chirping magnitude can be altered by improving the compensation circuit as shown in FIG. 6. The compensation circuit shown in FIG. 6 can be obtained by adding a polarity reversing circuit (POL REV) (15) to the compensation circuit shown in FIG. 3, for reversing the polarity of the LF SIG ($f_o$) applied to the LF SUPERPOSE 3 from the LF OSC 4.

When the polarity of the LF SIG ($f_o$) is reversed, the reversed LF SIG ($f_o$) is superposed on the driving signal at the LF SUPERPOSE 3. However, since the STABILIZ CIRCUIT 2 in FIG. 6 is the same as that in FIG. 3, the STABILIZ CIRCUIT 2 is a feedback system operating in reverse to the LF SIG ($f_o$). Therefore, the bias voltage $Vb_1$ is shifted to $Vb_2$, and the polarity of a is reversed. Besides, the polarity of the input driving signal must be reversed by a circuit not depicted in FIG. 6, because, when the modulation is performed at the bias voltage $Vb_1$, the optical output increases as the driving signal increases, and when the modulation is performed at the bias voltage $Vb_2$, the optical output increases as the driving signal decreases. As a result, in FIG. 6, in order to keep the same relationship between the driving signal (data signal) and the optical pulse in regard to their increase or decrease directions, the polarity of the driving signal must be reversed beforehand, which is different from the case of FIG. 3.

As described above, when the optical pulse is transmitted through the optical fiber transmission line over a long distance, the waveform of the optical pulse deteriorates due to the wavelength dispersion and the non-linear effect of the optical transmission line. The waveform deterioration can be prevented from occurring by applying the pre-chirping method to the optical modulator, especially by selecting the operation points of the optical modulator.

However, when the optical multiplexing is performed with the plural optical modulators, in order to compensate the waveform deterioration of the transmitting optical output signal effectively, there have been many problems in the control of the pre-chirping. In particular, when the control of the pre-chirping is performed by shifting the operation points of the optical modulator, it has been required that other characteristics of the transmitting optical output signal should not be affected by the operation point shift and the operation point shift should be performed effectively by a simple circuit. Furthermore, when plural optical modulators include optical modulators capable of continuously changing a, the a must be also changed continuously and effectively.

SUMMARY OF THE INVENTION

Therefore, when the pre-chirping technique is applied to a plurality of the optical modulators in the optical transmitter, an object of the present invention is to control the pre-chirping magnitude so as to effectively compensate the waveform deterioration due to the transmission line.

When the control of the pre-chirping magnitude is performed by shifting the operating points of the optical modulators, another object of the present invention is to shift the operating points of the optical modulators effectively and without affecting other characteristics of the optical output signal transmitted through the transmission line.

Another object of the present invention is to control the operating point shifting by a simple apparatus.

When a plurality of optical modulators include optical modulators capable of continuously changing the chirping magnitude, still another object of the present invention is to change the pre-chirping magnitude continuously in correspondence with the continuous change of the chirping magnitude, effectively.

The above objects are accomplished by improving a control unit for an optically modulating apparatus including a plurality of optical modulators which produce the optical output signal in a series of optical pulses. The control unit operates as follows:

when pre-chirping magnitude is required to be changed, the control unit controls not the whole of the optical modulators but the optical modulators only required to perform the pre-chirping compensation, and the control is performed in keeping the characteristics of the optical output signal to the same as the characteristics existing before performing the pre-chirping compensation except a new characteristic obtained due to the pre-chirping compensation;

when the optical transmission system operates under the OTDM and the optically modulating apparatus is composed of optical modulators arranged in parallel for producing optical pulse output in different time slots respectively at the same wavelength, the control unit controls the optically modulating apparatus so that the optical modulators change pre-chirping magnitude at the same time;

when the optical transmission system operates under the WDM and the optically modulating apparatus is composed of optical modulators arranged in parallel for producing optical pulse output at different wavelengths, the optical modulators are divided into groups in accordance with degree of the waveform deterioration suffering from the characteristics of the optical transmission line because of a wavelength belonging to each group, and the control unit controls the optically modulating apparatus so that the optical modulators change pre-chirping magnitude every group of the optical modulators;

in the same of the above case, the optical modulators are divided into two groups, one group for producing optical output at wavelengths longer than a zero-dispersion wavelength of the optical transmission line and another group for producing optical output at wavelengths shorter than the zero-dispersion wavelength, and the control unit controls the optically modulating apparatus so that the optical modulators change the pre-chirping magnitude every group of the optical modulators;

when the optically modulating apparatus is composed of optical modulators which perform the pre-chirping compensation by shifting the operating points of the optical modulators, the control unit controls the optical modulators so that the characteristics of the optical output signal transmitted from the optical transmitter are not changed by the operating point shifting, by reversing the polarity of the driving signals in cooperation with the operating point shifting;

when the optically modulating apparatus is composed of Mach-Zehnder type optical modulators which operate under the OTDM or WDM and a proper chirping magnitude can be given to each optical modulator in keeping a difference of phase shift, which appears between signal electrodes provided to waveguide layers placed at both input and output sides of each optical modulator, in a proper value, the control unit controls the Mach-Zehnder type optical modulators so that the pre-chirping magnitude is changed by changing amplitude and polarity of the driving signal applied to the signal electrodes in cooperation with the operating point shifting;

when the optically modulating apparatus is composed of Mach-Zehnder type optical modulators and optical phase modulators connected with the Mach-Zehnder type optical modulators individually in series and the Mach-Zehnder type optical modulator performs optical intensity modulation and the optical phase modulator performs a phase change in a reverse direction against rising and falling phases of the optical output from the Mach-Zehnder type optical modulator respectively, the control unit controls the Mach-Zehnder type optical modulators and optical phase modulators so that the chirping magnitude of each Mach-Zehnder type optical modulator is changed continuously by reversing a phase of a driving signal for each optical phase modulator in correspondence with the operating point shifting performed at each Mach-Zehnder type optical modulator and changing the amplitude of the driving signal for each optical phase modulator;

when the optically modulating apparatus is composed of Mach-Zehnder type optical modulators and conventional optical modulators which are connected in series individually and the Mach-Zehnder type optical modulator produces a series of RZ (Return to Zero) optical pulses by performing modulation in synchronization with a clock signal at a half frequency of the optical output signal and the conventional optical modulator performs modulation with a driving signal, the control unit controls the optically modulating apparatus so that the pre-chirping magnitude is changed by shifting the operating points of the Mach-Zehnder type optical modulators and performing phase shift in between the driving signal and RZ pulse as much as a half clock interval in cooperation with the operating point shifting; and when an optically modulating apparatus is composed of first stage optical modulators each for producing a series of RZ pulses in synchronization with a clock signal, second stage optical modulators each for modulating branched RZ pulses, which are obtained by branching the RZ pulses, into modulated optical output with a driving signal, and a combiner for combining the modulated optical output from the second stage optical modulators into an optical output signal, the control unit controls the optically modulating apparatus so that the pre-chirping magnitude is changed by controlling the first stage optical modulator and a phase of the clock signal fed to the first stage optical modulator is reversed in cooperation with the control of the the first stage optical modulator, respectively.

By virtue of improving the control unit for the optically modulating apparatus as described above, the change of the pre-chirping magnitude can be performed effectively and smoothly without affecting other characteristics of the optical output signal due to the transmission line of the optical transmission system.

DESCRIPTION OF THE PREFERRED EMBODIMENTS

Figure 1:
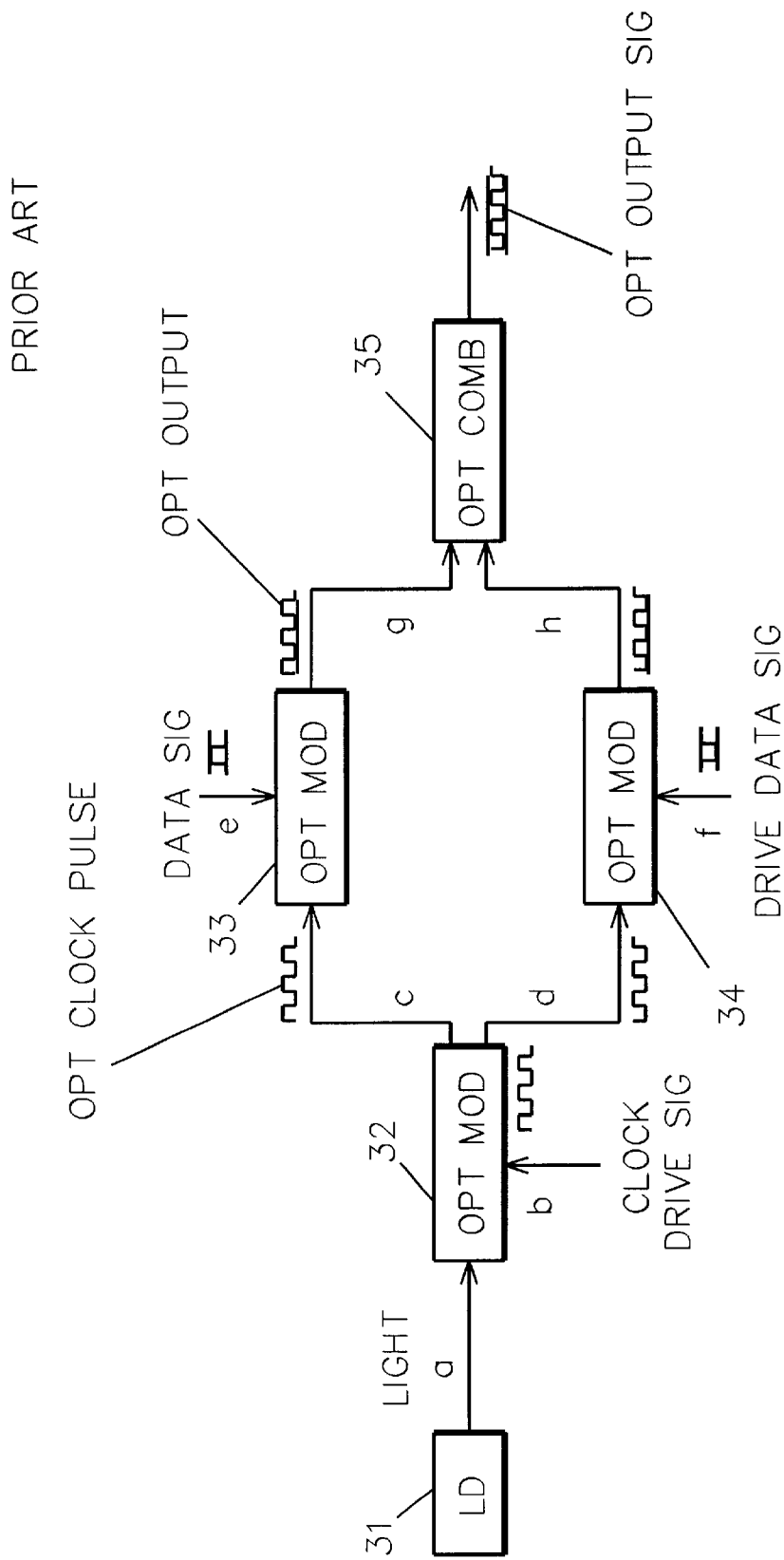
FIG. 1 is a block diagram of an example of an optically modulating apparatus in the prior art.
Figure 2A:
FIG. 2A through 2I are time-charts for illustrating waveforms of signals on circuits of the optically modulating apparatus in FIG. 1.
Figure 2B:
Figure 2C:
Figure 2D:
Figure 2E:
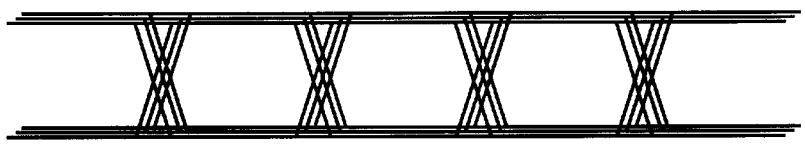
Figure 2F:
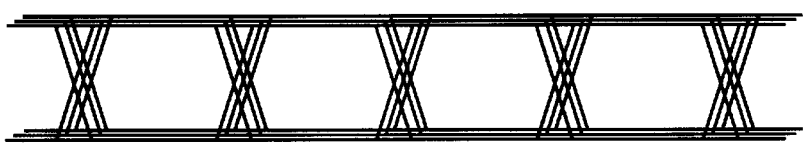
Figure 2G:
Figure 2H:
Figure 2I:
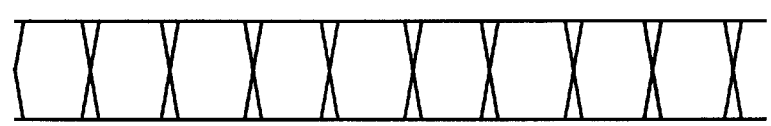
Figure 3:
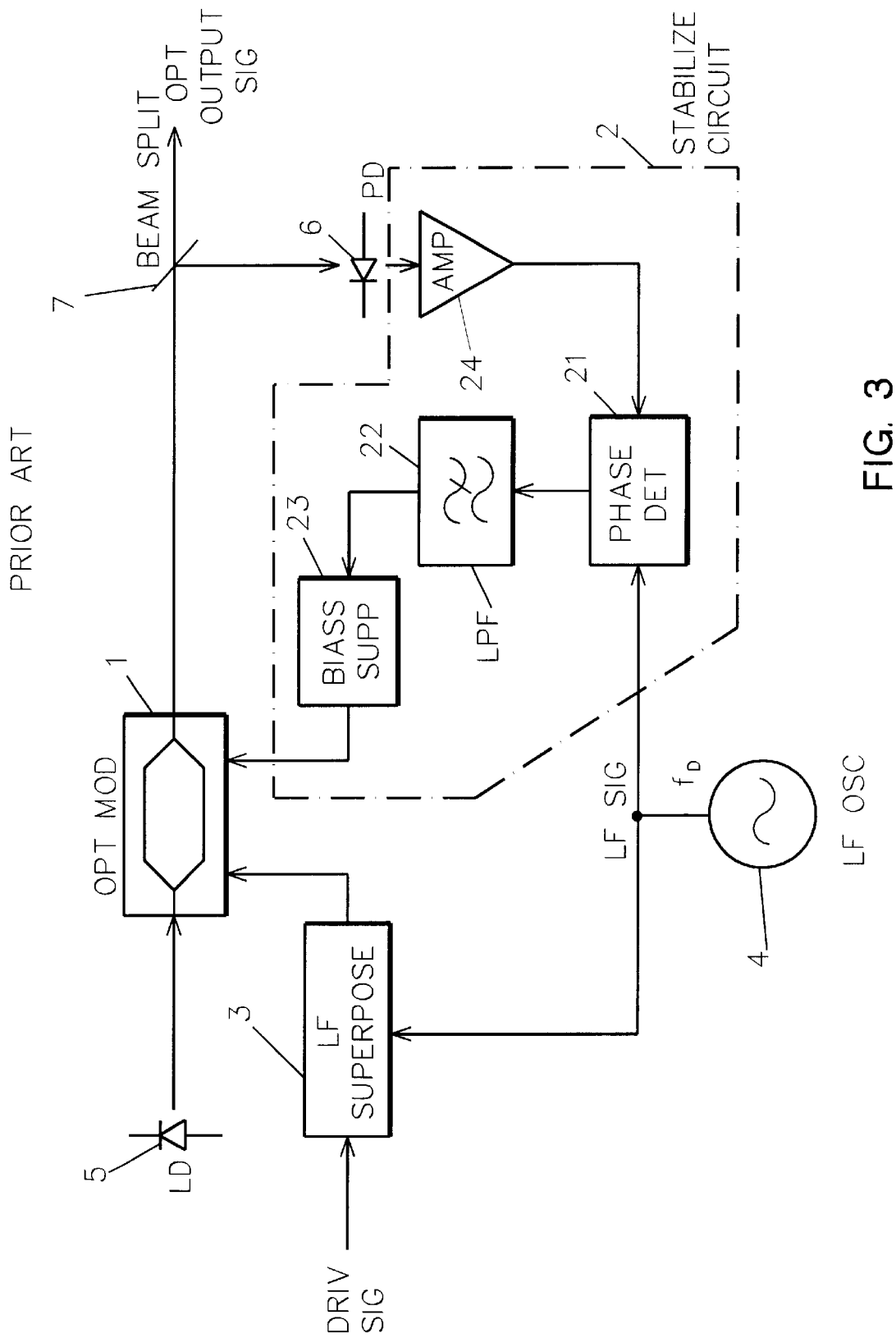
FIG. 3 is a block diagram of a Mach-Zehnder type optically modulating apparatus of the prior art.
Figure 4:
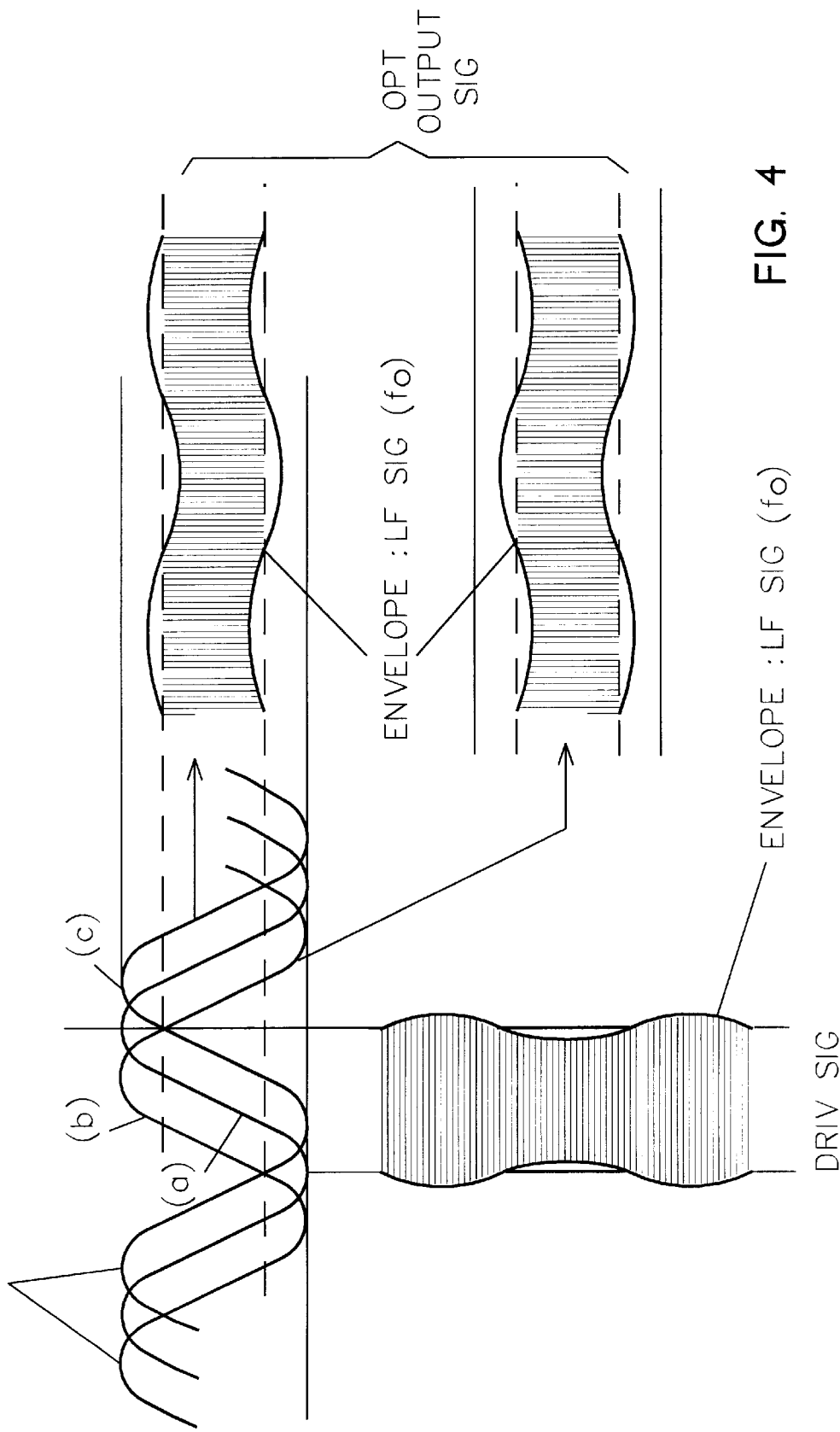
FIG. 4 is a drawing of waveforms for illustrating an operating principle of bias control for a Mach-Zehnder type optical modulator of the prior art.
Figure 5A:
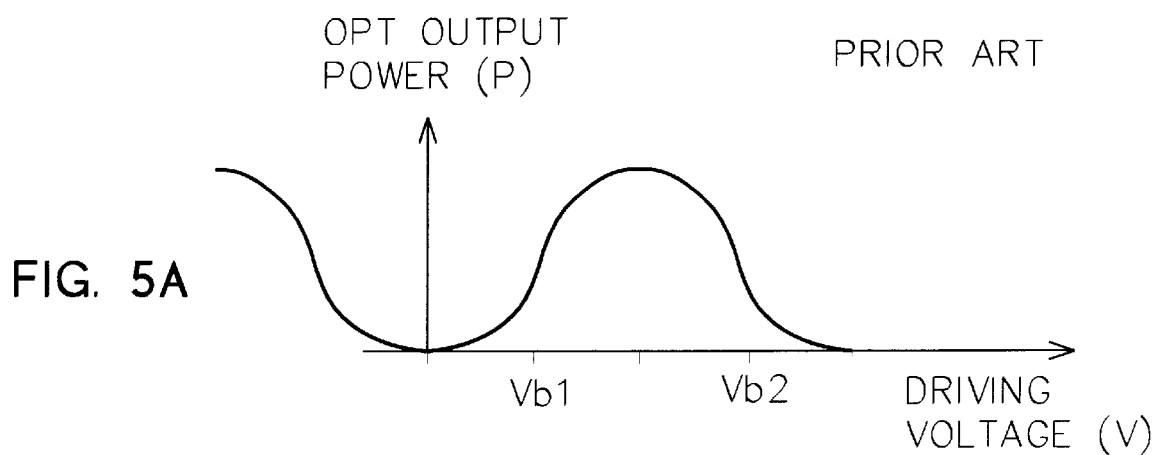
FIG. 5A is a graph for illustrating a sine curve relation between a driving voltage and an optical output of a Mach-Zehnder type optical modulator of the prior art.
Figure 5B:
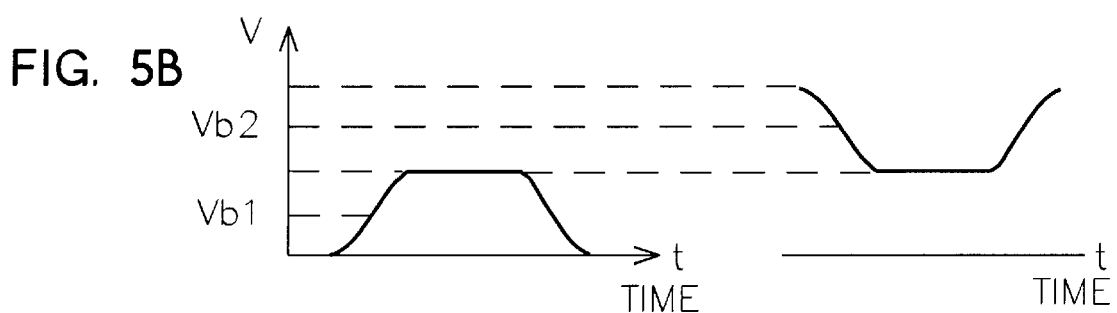
FIG. 5B is a graph for illustrating positive and negative driving voltages applied to the Mach-Zehnder type optical modulator of the prior art.
Figure 5C:
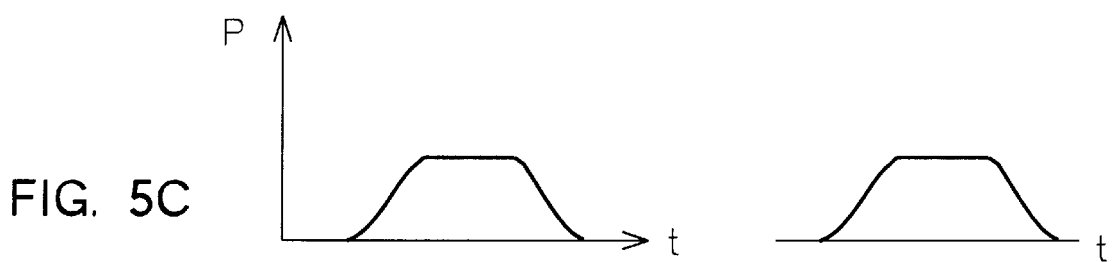
FIG. 5C is a graph for illustrating optical output of the Mach-Zehnder type optical modulator of the prior art.
Figure 5D:
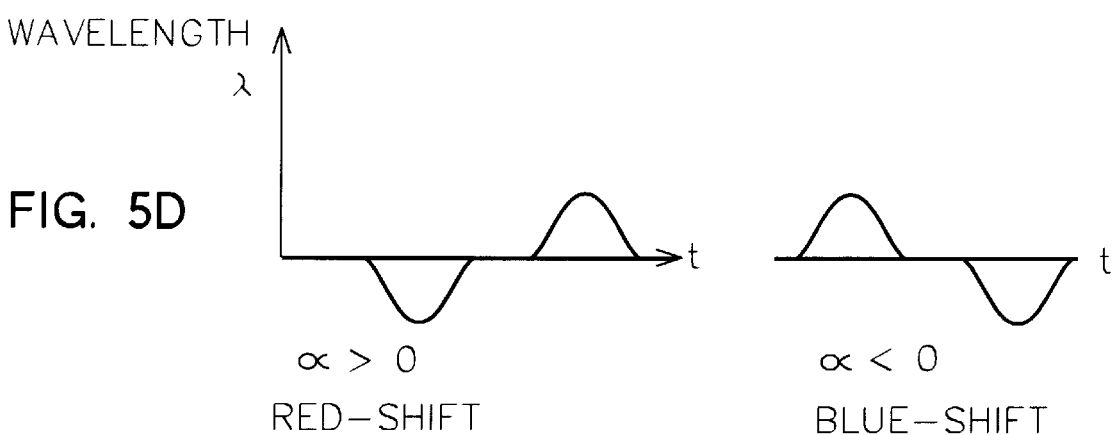
FIG. 5D is a graph for illustrating blue-shift chirping and red-shift chirping.

The preferred embodiments of the present invention will be described in reference with FIGS. 7 to 16. Throughout the figures, the same reference numeral or sign designates the same unit or circuit.

Figure 7:
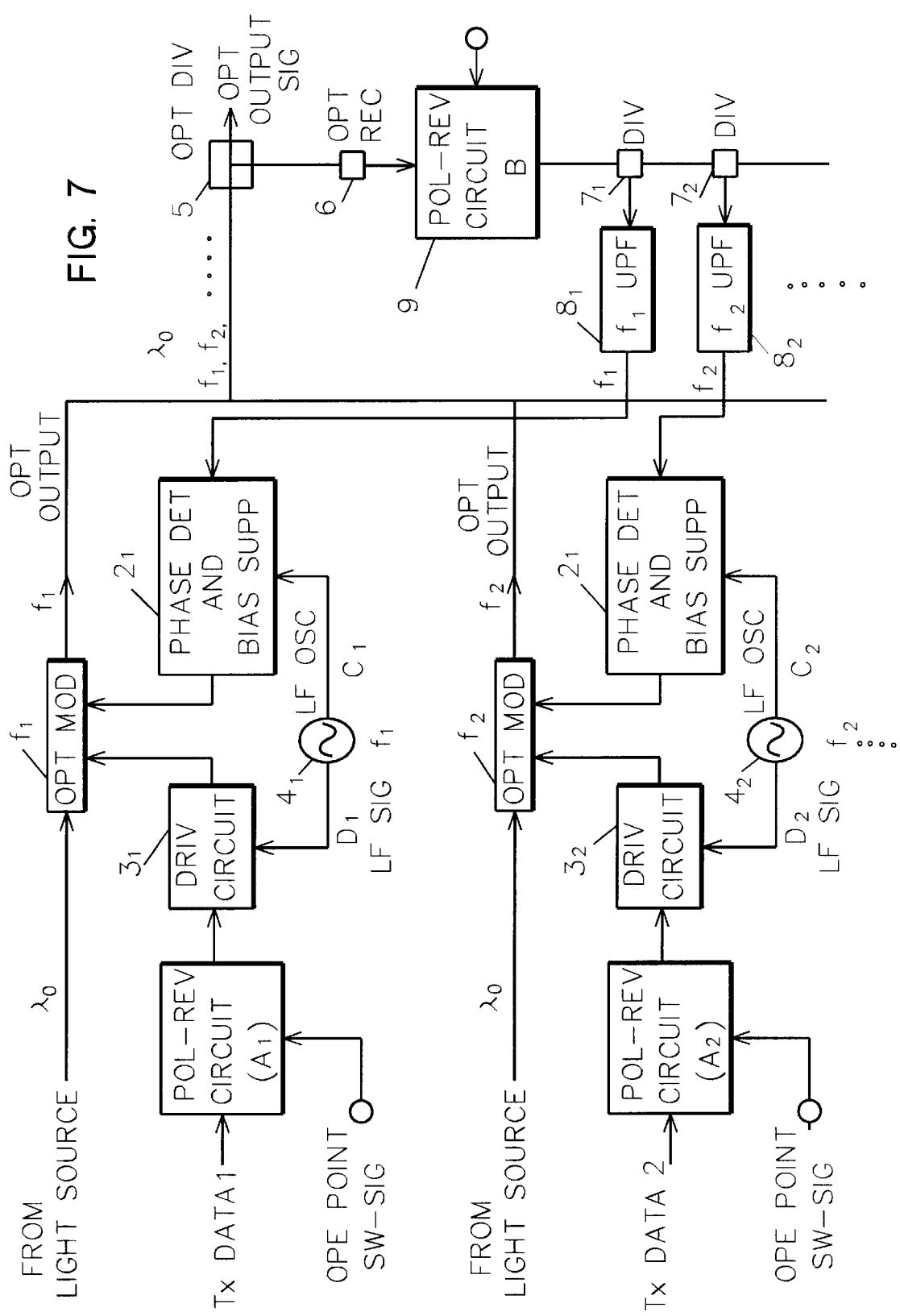
FIG. 7 is a block diagram of an optically modulating apparatus including a control unit of a first embodiment of the present invention.

FIG. 7 is a block diagram of an optically modulating apparatus for performing optical modulation under the OTDM. The optically modulating apparatus includes optical modulators arranged in parallel to each other and a control unit concerning the first embodiment for controlling the optically modulating apparatus.

In FIG. 7, a plurality of optical modulators (OPT MODs) ($1_1$, $1_2$, —) are arranged in parallel and a laser light of wavelength $\lambda_o$ is fed from a light source, not depicted in FIG. 7, to the OPT MODs $1_1$, $1_2$, —. Driving circuits (DRIVE CIRCUITs) ($3_1$, $3_2$, —) produce driving signals for the OPT MODs $1_1$, $1_2$, —by superimposing low frequency signals (LF SIGs) ($D_1$, $D_2$, —) sent from low frequency generators (LF OSCs) ($4_1$, $4_2$—) at low frequency ($f_1$, $f_2$ —) onto transmitting data signals (Tx DATA (1), (2), —) by amplitude modulation, respectively. The Tx DATA 1, 2, —are fed to the DRIVE CIRCUITs $3_1$, $3_2$, —through polarity reversing circuits (POL-REV CIRCUIT) ($A_1$), ($A_2$), —, respectively. At POL-REV CIRCUIT($A_1$) ($A_2$), —, the polarity of the Tx DATA 1, 2, —is switched so as to be or not to be reversed by an operating point switching signal (OPE-POINT SW-SIG) respectively. When the OPT MODs $1_1$, $1_2$, —are Mach-Zehnder type optical modulators for changing the pre-chirping magnitude by shifting operating points of the OPT MODs $1_1$, $1_2$, —, the POL-REV CIRCUIT($A_1$), ($A_2$), —operate for making the polarity of an optical output signal of the optically modulating apparatus the same as the polarity of the driving signals of the OPT MODs $1_1$, $1_2$, —, respectively.

For instance, in a case where the operating points (bias voltages) of the OPT MODs $1_1$, $1_2$, —are set up so that light intensity of modulated optical output of the OPT MODs $1_1$, $1_2$ —increases with the increase of driving voltages of the driving signals and the polarity of the driving signals are set up so that a proper optical output signal is produced from the optically modulating apparatus, when the OPE POINT SW-SIGs are applied to the POL-REV CIRCUIT($A_1$) ($A_2$), —so as to reverse the polarity of the pre-chirping coefficient of the OPT MODs $1_1$, $1_2$, —, the operating points of the OPT MODs $1_1$, $1_2$, —are switched so that the optical modulation is performed to decrease the light intensity with the increase of the driving voltage. That is, the polarity of the driving signals is reversed for obtaining RZ pulses the same as the RZ pulses which existed before switching the operating points.

In FIG. 7, the optical output of the OPT MODs $1_1$, $1_2$, —is combined as an optical output signal of the optically modulating apparatus and a part of the optical output signal is divided into a monitoring optical output signal at an optical divider (OPT DIV) (5). The monitoring optical output signal is converted to a monitoring electric signal at an optical receiver (OPT REC) (6) and the monitoring electric signal is sent to a POL-REV CIRCUIT(B) (9). Receiving the monitoring electric signal and the OPE POINT SW-SIG, the POL-REV CIRCUIT(B) 9 produces the monitor signal with a polarity left as it is or reversed the same as the POL-REV CIRCUIT($A_1$), ($A_2$), —. The monitor signal is divided into divided monitor signals at dividing circuits (DIVs) $7_1$, $7_2$, —respectively and the divided monitor signals are sent to phase detection and bias voltage supply circuits (PHASE DET & BIAS SUPPs) ($2_1$, $2_2$, —) through band pass filter (BPFs) ($8_1$, $8_2$, —), respectively. The BPF $8_k$ is for making low frequency (LF) ($f_k$) of superimposed low frequency component pass. Wherein, "k" indicates either one of 1, 2, —, and the "k" will be used representatively hereinafter.

The PHASE DET & BIAS SUPP $2_k$ detects drift magnitude of the operating point of the OPT MOD $1_k$ by comparing the phase of the low frequency component in the optical output signal and the phase of the LF $f_k$ and controls the bias voltage of the OPT MOD $1_k$ so as to eliminate the drift magnitude. Since the control is performed for the OPT MODs $1_1$, $1_2$, —at the same time and independently, the optimum compensation can be performed to the chirping phenomenon in the OPT MODs $1_1$, $1_2$, —.

The switching of the pre-chirping for the OPT MOD $1_k$ can be controlled collectively by sending the OPE POINT SW-SIG to the POL-REV CIRCUIT ($A_k$), not sending different operating point switching signal individually. This simplifies the control of the OPT MOD $1_k$. The first embodiment is effective for the optically modulating apparatus producing the optical output signal under the OTDM. Because, in the OTDM, every pulse of the optical output signal includes data at the same frequency, having the same waveform deterioration.

Figure 6:
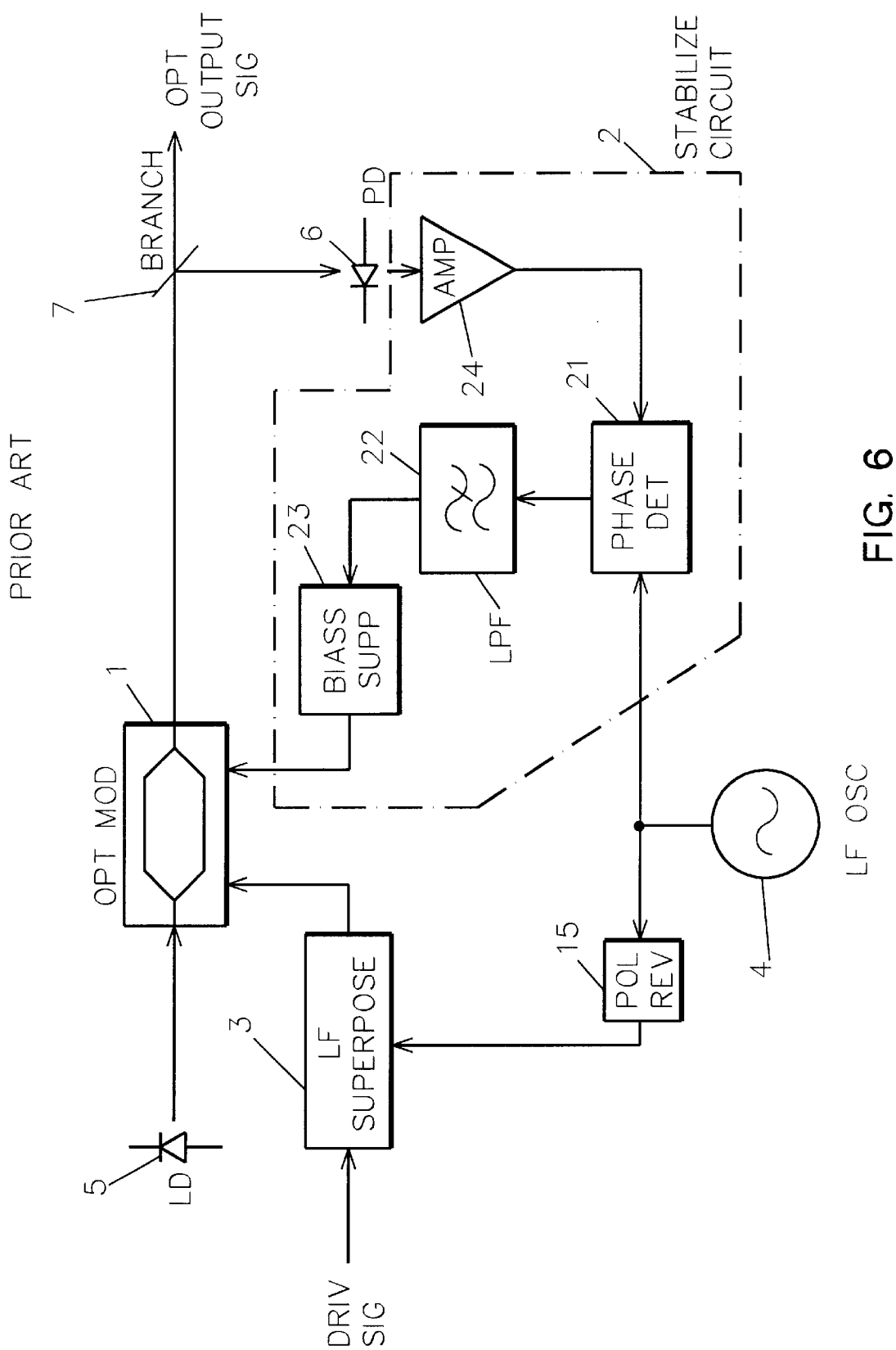
FIG. 6 is a block diagram of an improved Mach-Zehnder type optically modulating apparatus of the prior art.

The POL-REV CIRCUIT(B) 9 can be placed on a circuit $D_k$ in between the LF OSC $4_K$ and the DRIVE CIRCUIT $3_k$ the same as in FIG. 6 or on a circuit $C_k$ in between the LF OSC $4_K$ and the PHASE DET & BIAS SUPP $2_k$. In case of FIG. 6, there is a merit that the polarity can be reversed in a low speed signal region. However, by virtue of placing the POL-REV CIRCUIT(B) 9 before the DIV $7_k$ as shown in FIG. 7, there is a merit that the circuit can be simplified.

As described in the first embodiment, in the Mach-Zehnder type optical modulators arranged in parallel, the operating points can be shifted collectively, so that the pre-chirping can be performed effectively. The operating points are shifted by switching the POL-REV CIRCUIT(B) 9. However, since the operating points are shifted the, logic in the electrical and optical modulation is reversed. Therefore, the phases of the driving signals are reversed by switching the POL-REV CIRCUIT($A_1$) ($A_2$), —. The shift of the operating points is performed by giving the OPE POINT SW-SIG to the POL-REV CIRCUIT($A_1$) ($A_2$), —and the POL-REV CIRCUIT(B) 9 respectively. The OPE POINT SW-SIG is given by operating an external switch or from the optical data transmission system which automatically performs switching after investigating the characteristics of the transmission line. The external switch and the automatic switching device in the system are not depicted in FIG. 7.

Figure 8B:
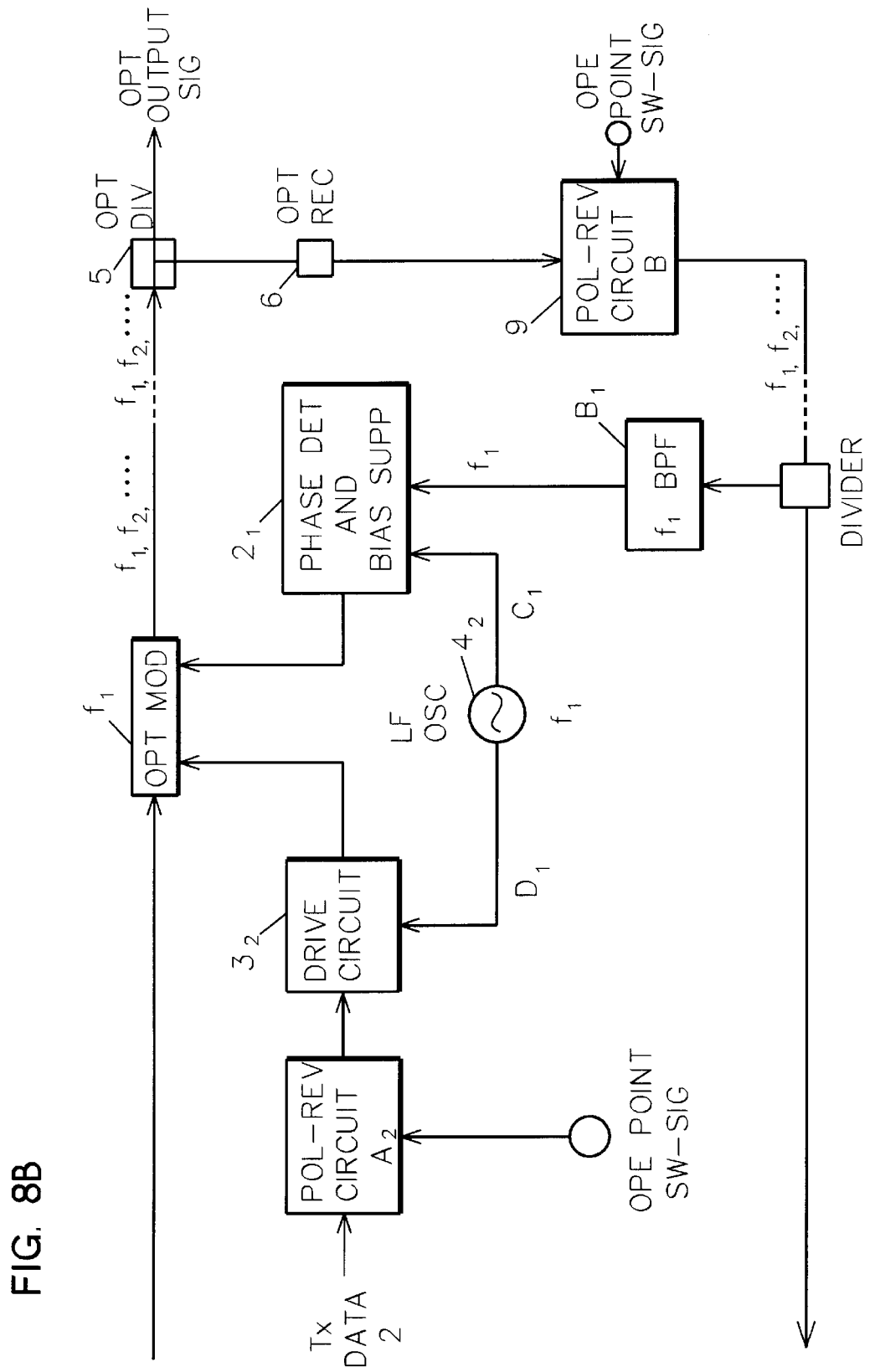
FIG. 8 is a block diagram of an optically modulating apparatus including a control unit of a second embodiment of the present invention.

FIG. 8 is a block diagram of an optically modulating apparatus for the second embodiment of the present invention. The optically modulating apparatus in FIG. 8 performs optical modulation under an optical phase multiplexing technique which is a kind of the OTDM. The optically modulating apparatus includes Mach-Zehnder type optical modulators connected in series and a control unit concerning the second embodiment, for the optical modulators.

In FIG. 8, the operating points of OPT MODs ($1_1$, $1_2$, —) are shifted in a linked manner. The OPT MODs $1_1$, $1_2$, —are connected in series and output light of a laser diode, not depicted in FIG. 8, having a wavelength λo is modulated by the OPT MODs $1_1$, $1_2$, —, more than two times. Continuous wave (CW) light from the laser diode is modulated into a series of RZ optical pulses at the first OPT MOD $1_1$, and the RZ optical pulses are modulated into optical pulses having different phases from each other and the same phase at every the Nth pulse when the number of the OPT MODs $1_2$, $1_3$, —is N. That is, in the second embodiment, the optically modulating apparatus performs optically N muliplexing at a single wavelength.

Receiving Tx DATA (1, 2, —) through POL-REV CIRCUITs ($A_1$, $A_2$, —), DRIV CIRCUITs ($3_1$, $3_2$, —) superimpose LF SIGs ($D_1$, $D_2$, —) sent from an LF OSCs ($4_1$, $4_2$, —) at frequencies ($f_i$, $f_2$, —) on the Tx DATA 1, 2, —, producing driving signals for the OPT MODs $1_1$, $1_2$, —, respectively. An optical output signal of the optically modulating apparatus is divided at an OPT DIV (5) and divided optical output signal is converted to an electric signal at an OPT REC (6) and the converted electric signal is sent to a POL-REV CIRCUIT (B) (9). Receiving the converted electric signal and the OPE POINT SW-SIG, the POL-REV CIRCUIT (B) 9 produces a plurality of LF components sent to PHASE DET & BIAS SUPPs ($2_1$, $2_2$, —) through BPFs ($8_1$, $8_2$, —) respectively. The BPF $8_k$ passes a superimposed LF component having frequency $f_k$.

The PHASE DET & BIAS SUPP $2_k$ detects the drift of the operating point of the OPT MOD $1_K$ by comparing the phase of the superimposed LF component having frequency $f_k$ passing through the BPF $8_k$ with the phase of the LF SIG sent from the LF OSC $4_K$ and controls the bias voltage of the OPT MOD $1_K$ SO as to eliminate the detected drift. The control is performed to the OPT MODs $1_1$, $1_2$, —respectively at the same time.

The second embodiment of the present invention can be effectively applied to the optically modulating apparatus for producing an optical output signal composed of RZ pulses, under OTDM. For example, the optical output signal composed of the RZ pulses can be produced from the optically modulating apparatus effectively by: making the OPT MOD $1_1$ produce RZ pulses from CW light; making other OPT MODs $1_2$, $1_3$, —modulate the RZ pulses with 10 Gb/s in different phase respectively; and combining the modulated RZ pulses.

The change of the pre-chirping magnitude is performed by shifting the operating points of the OPT MODs $1_1$, $1_2$, —collectively at the POL-REV CIRCUIT($A_1$), ($A_2$), —, and the POL-REV CIRCUIT(B). The POL-REV CIRCUIT(B) may be place in circuits $D_1$, $D_2$, —or circuits $C_1$, $C_2$, —shown in FIG. 8.

Figure 9:
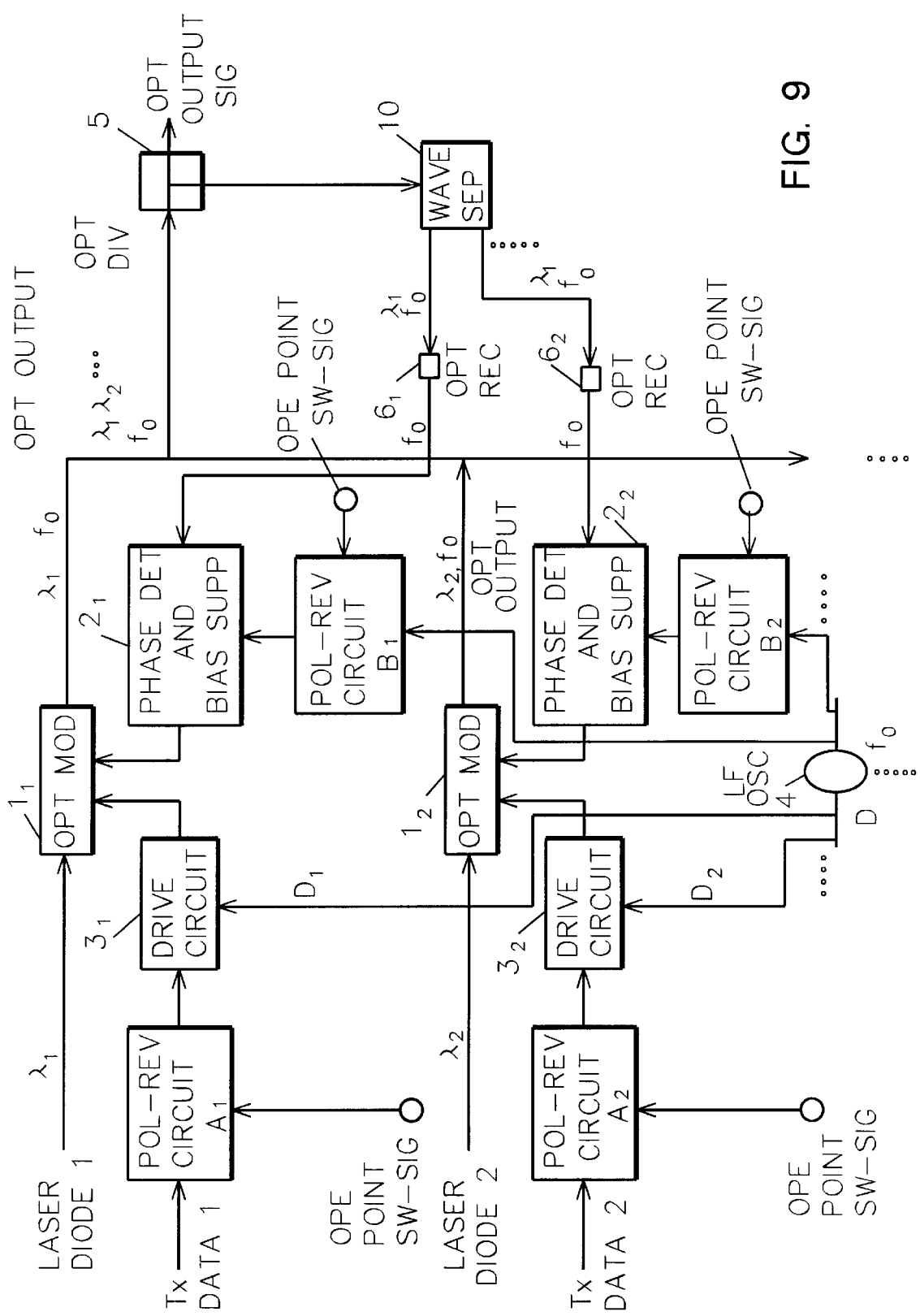
FIG. 9 is a block diagram of an optically modulating apparatus including a control unit of a third embodiment of the present invention.

FIG. 9 is a block diagram of an optically modulating apparatus for the third embodiment of the present invention. The optically modulating apparatus in FIG. 9 performs optical modulation under the WDM. The optically modulating apparatus includes OPT MODs connected in parallel and a control unit concerning the third embodiment, for the OPT MODs.

In FIG. 9, OPT MODs ($1_1$, $1_2$, —) are arranged in parallel for performing optical modulation under WDM at wavelength $\lambda_1$, $\lambda_2$, —respectively, and DRIVE CIRCUITs ($3_1$, $3_2$, —) are connected with the OPT MODs $1_1$, $1_2$, —for sending driving signals thereto, by superimposing the LF SIG at frequency $f_o$ on Tx DATA (1, 2, —) given to the optically modulating apparatus, respectively. The Tx DATA 1, 2, —are sent to the DRIVE CIRCUITs 3, $3_2$, —through POL-REV CIRCUITs ($A_1$), ($A_2$), —respectively. At the POL-REV CIRCUITs ($A_1$), ($A_2$), —, the polarity of the Tx DATA 1, 2, —is left as they are or reversed in accordance with an OPE POINT SW-SIG given to the POL-REV CIRCUITs ($A_1$), ($A_2$), —respectively. When each of the OPT MODs $1_1$, $1_2$, —is a Mach-Zehnder type modulator, the POL-REV CIRCUITs ($A_1$), ($A_2$), —are controlled in accordance with the OPE POINT SW-SIG so that an optical output signal of the optically modulating apparatus and the driving signal (Tx DATA k) are kept in the same corresponding relation before and after the switching operation due to the OPE POINT SW-SIG.

An LF OSC (4) supplies an LF SIG at frequency $f_o$ to the PHASE DET & BIASes $2_1$, $2_2$, —through POL-REV CIRCUITs ($B_1$), ($B_2$), —at which the polarity of the LF SIG can be changed in accordance with the OPE POINT SW-SIG independently. The POL-REV CIRCUITs ($B_1$), ($B_2$), —can be placed between the LF OSC 4 and the OPT MOD 1k (on circuit $D_k$ in FIG. 9). Doing thus, the polarity of the superimposing LF SIG is reversed, resulting in shifting the operating point of the OPT MOD $1_k$.

The OPT MODs $1_1$, $1_2$, —produce optical signals at different wavelength $\lambda_1$, $\lambda_2$, —including the Tx DATA 1, 2, —and the superimposed LF signal of the LF $f_o$, respectively. The optical signals from the OPT MODs $1_1$, $1_2$, —are combined into an optical output signal as an optical wavelength multiplexing output of the optically modulating apparatus. The optical output signal is divided into a part at an OPT DIV (5) and the part is led to a wavelength separator (WAVE SEP) (10) at which the part is optically separated to optical signals having wavelength $\lambda_1$, $\lambda_2$, —respectively. The separated optical signals are converted to electric signals at OPT RECs ($6_1$, $6_2$, —), and the converted electric signals are sent to the PHASE DET & BIAS SUPPs $2_1$, $2_2$, —respectively. The PHASE DET & BIASes $2_1$, $2_2$, —control the drift of the operating points of the OPT MODs $1_1$, $1_2$, —. The control is performed at the PHASE DET & BIASes $2_1$, $2_2$, —at the same time and independently by detecting the drift magnitude by comparing a phase a low frequency ($f_o$) component of the converted electric signal and a phase of the low frequency ($f_o$) signal sent from the LF OSC 4.

Instead of the LF $f_o$, different low frequencies $f_1$, $f_2$, —can be used as described in reference with FIG. 8. However, in the third embodiment, the WAVE SEPARATOR 10 is used for applying the feature of the WDM to the control unit. The third embodiment is effective when wavelength is well separated optically.

In the WDM, since a plurality of the optical modulators are arranged in parallel, if the transmission characteristics of the transmission line are previously known, it may be effective to switch collectively the chirping magnitude of optical modulators concerning wavelength having the same transmission characteristics.

In particular, when the operating points are selected after determining whether the wavelength concerning the optical modulators is longer or shorter than the zero dispersion wavelength of the transmission line, it is effective to separate the optical modulators into two groups, a group concerning a wavelength longer than the zero dispersion wavelength and another group concerning a wavelength shorter than the zero dispersion wavelength, and change the chirping coefficient at every group collectively.

If the relationship between wavelength dispersion on the transmission line and wavelength of the optical output signal is previously known, the waveform deterioration caused by the transmission line can be estimated and the polarity (plus or minus) of the pre-chirping magnitude can be estimated previously.

In other words, it can be predicted which operating points the optical modulators should be operated at every wavelength. As a result, the optical modulators can be separated into the two groups for easily shifting the operating points at every group. This results in simplifying the control unit and increasing the control efficiency for the pre-chirping operation.

Figure 10:
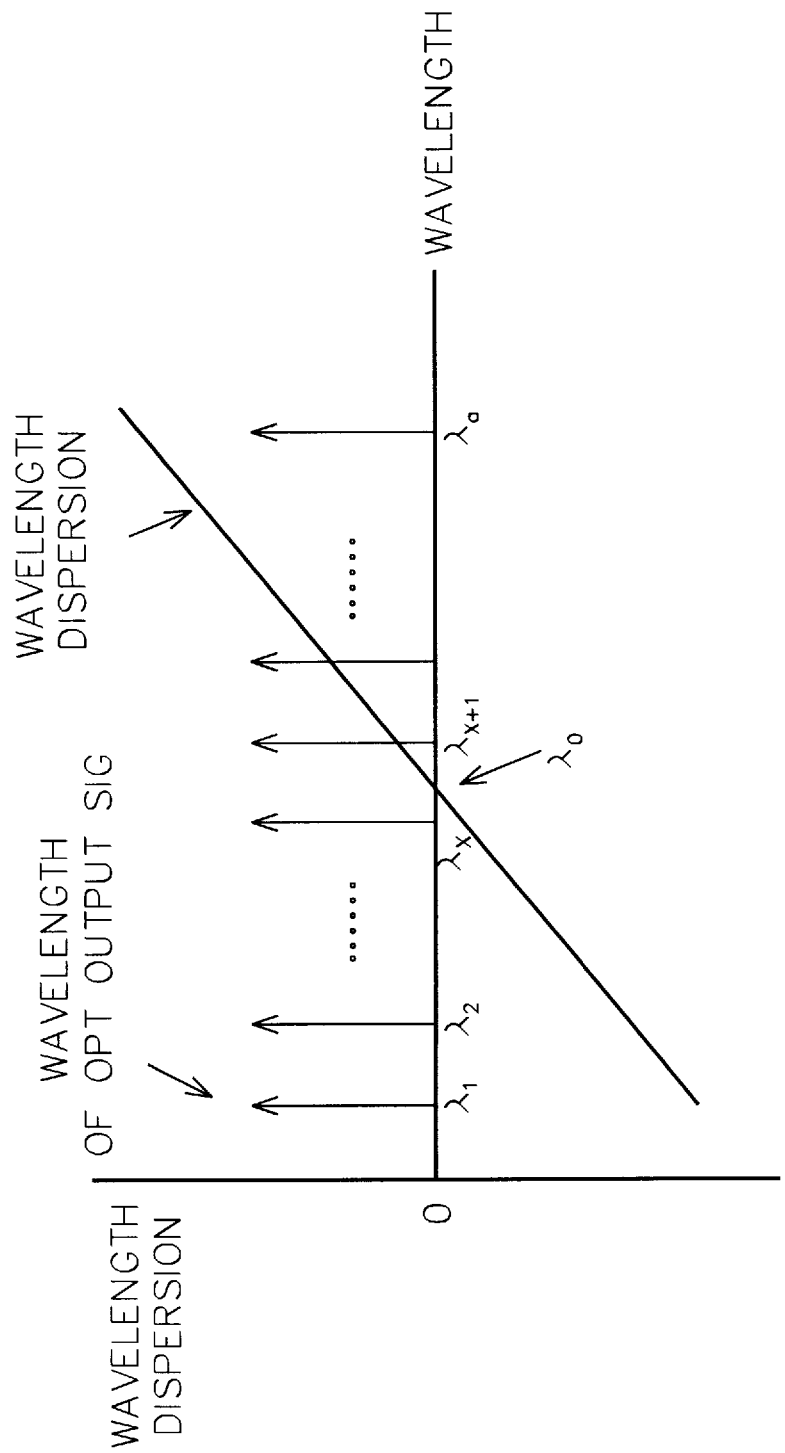
FIG. 10 is a graph for illustrating a relation between wavelength of an optical output signal of an optically modulating apparatus and zero chromatic dispersion of a transmission line.

FIG. 10 is a graph of the chromatic dispersion of the transmission line, plotted with a slanting line on a plane made by a horizontal axis for wavelength and a vertical axis for chromatic dispersion. In FIG. 10, the wavelengths of the optical output signal produced from the optical modulators under the WDM are also shown by lines directed on the horizontal axis illustrating the relation between the wavelength dispersion of the transmission line and the wavelengths of the optical output signal. In FIG. 10, a wavelength at a cross point of the slanting line and the horizontal axis is a specified wavelength called "zero dispersion wavelength $\lambda o$". FIG. 10 shows an example in a case where the wavelength of the optical output signal is $\lambda_i$(i=1, 2, —k, k+1, k+2, —or n). The wavelength $\lambda_i$ is distributed at both sides of $\lambda o$ on the horizontal axis so that when i=1, 2, —or k, $\lambda_i$ is smaller than $\lambda_o$, and when i=k+1, k+2, —or n, $\lambda_i$ is larger than $\lambda o$. In this example, the OPE POINT SW-SIG is sent to two groups of the POL-REV CIRCUITs, a group of the POL-REV CIRCUITs $A_1$, $A_2$, —$A_k$ and $B_1$, $B_2$, —Bk and another group of the POL-REV CIRCUITs $A_{k+1}$, $A_{k+2}$, —$A_n$ and $B_{k+1}$, $B_{k+2}$, —$B_n$, for operating them independently in a linked manner respectively. When it is required to compress the waveshapes of the optical output signal formed by combining the optical output from the OPT MODs $1_1$, $1_2$, —$1_k$ and $1_{k+1}$, $1_{K+2}$, —$1_n$, the POL-REV CIRCUITs $A_1$, $A_2$, —, $A_k$ and $B_1$, $B_2$, —, $B_k$ are controlled so as to perform red shift ($\alpha>0$) and the POL-REV CIRCUITs $A_{k+1}$, $A_{K+2}$, —, and $A_n$ and $B_{k+1}$, $B_{K+2}$, —, and $B_n$ are controlled so as to perform blue shift ($\alpha<0$), by applying the OPE POINT SW-SIG thereto respectively.

Furthermore, in accordance with the OPE POINT SW-SIG, the operating point can be shifted to another stable point by reversing the phase of the LF SIG superposed on the driving signal. The reverse of the LF SIG' phase leads automatically to shift the operating point as much as a half period on an operating characteristic curve of the optical modulator.

In order to switch the shift function from the red shift to the blue shift and vice versa, the OPE POINT SW-SIG can be applied collectively from the outside of the optically modulating apparatus to the POL-REV CIRCUITs. The switching can be performed by manually operating a switching device at the outside of the optically modulating apparatus or by automatically in an optical data transmission system, after investigating the characteristics of the transmission line at a receiving side of the system.

In the first, second and third embodiments described above, the driving voltage for the Mach-Zehnder type optical modulator is always fixed and the pre-chirping is performed by only selecting either the red-chirp or the blue-chirp by shifting the operating point of the optical modulator.

However, the chirping magnitude can be changed continuously in the Mach-Zehnder type optical modulator as disclosed in a paper by S. K. Korotky et al., IPR'91 TuG 2. According to the paper, in the Mach-Zehnder type optical modulator, a signal electrode is attached to a pair of optical waveguides respectively and asymmetric modulation is performed by adding driving signals to the signal electrodes, and the pre-chirping magnitude is continuously changed by varying the amplitude of the driving signal.

By virtue of the Mach-Zehnder type optical modulator of S. K. Korotky et al., the pre-chirping magnitude can be continuously selected at high efficiency by controlling the amplitude and polarity of the driving signal in cooperation with the switching signal for the operating point of the optical modulator. The control is performed by a control unit concerning a fourth embodiment of the present invention.

Figure 11:
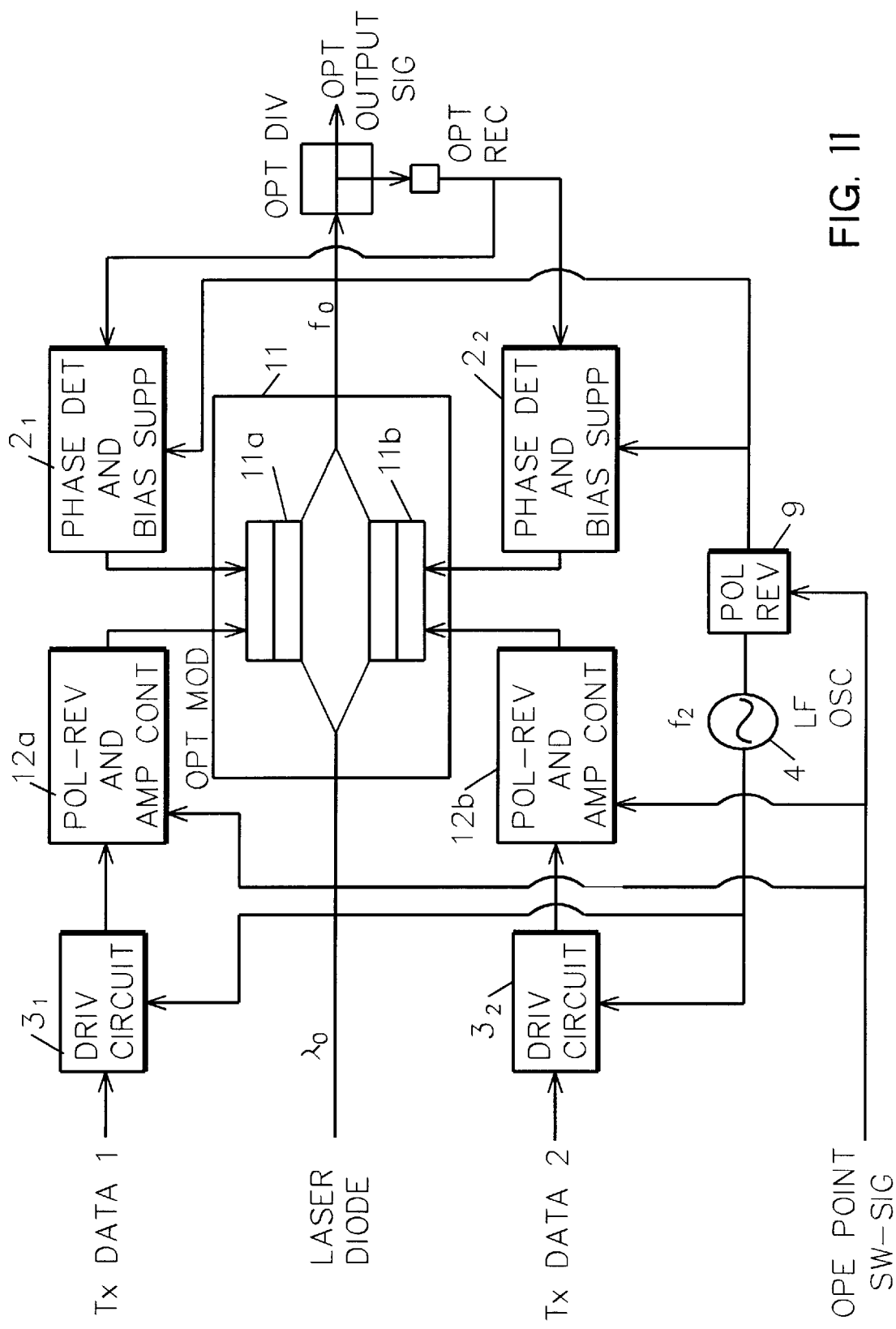
FIG. 11 is a block diagram of an optically modulating apparatus including a control unit of a fourth embodiment of the present invention.

FIG. 11 is a block diagram illustrating an optically modulating apparatus continuously selecting the pre-chirping magnitude including a Mach-Zehnder type optical modulator (OPT MOD) (11) and the control unit concerning the fourth embodiment. In FIG. 11, the signal electrodes (11a and 11b) are attached to waveguides in the optical modulator for applying driving voltages $V_1$ and $V_2$. Since the a plurality of this type of optical modulators can be used for producing an optical output signal under the OTDM or WDM as described in the first to the third embodiments in reference with FIGS. 17 to 19 respectively, the operation of this type optical modulator will be discussed in regard to one optical modulator.

Figures 12A, 12B:
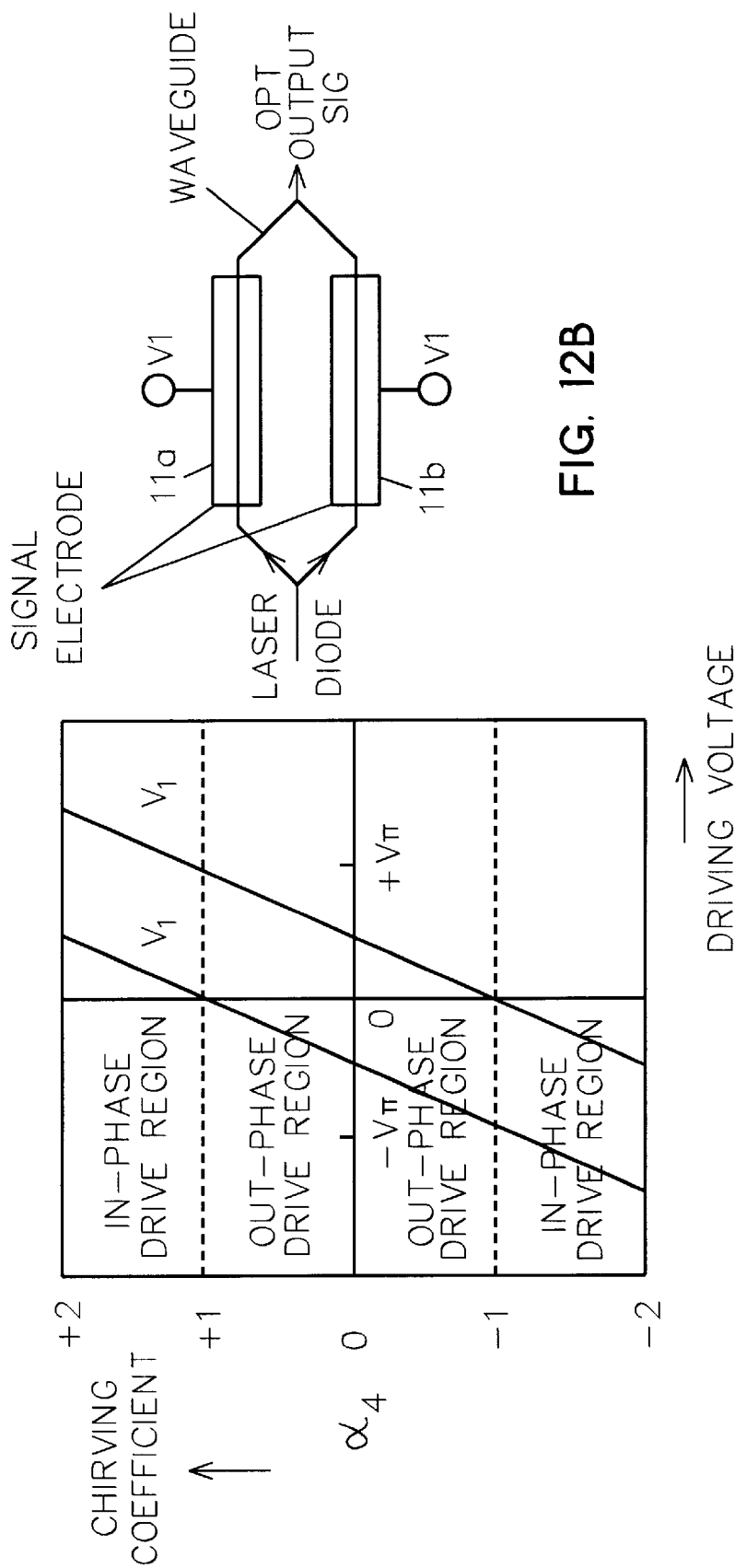
FIG. 12A is a graph for illustrating a relation between modulation ratio and a chirping parameter ($\alpha o$) in a waveguide type optical modulator.
FIG. 12B is a block diagram of the waveguide type optical modulator relating FIG. 12A.

In the OPT MOD 11 in FIG. 11, the chirping coefficient $\alpha$ can be continuously selected by changing the driving voltages $V_1$ and $V_2$ independently. The driving voltages $V_1$ and $V_2$ can be changed by controlling the amplitude of the driving voltages $V_1$ and $V_2$ and keeping a phase difference between the driving voltages $V_1$ and $V_2$ to 0 or $\pi$. FIG. 12A is a graph showing a relation between the chirping coefficient $\alpha$ (vertical axis) and amplitude (horizontal axis) of the driving voltages $V_1$ and $V_2$. FIG. 12B is a block diagram showing that the signal electrodes 11a and 11b are attached to branched waveguides respectively and the driving voltages $V_1$ and $V_2$ are applied to the signal electrodes 11a and 11b respectively.

In FIG. 12A, slanted lines represent the driving voltages $V_1$ and $V_2$. The slanted lines teach that: when the amplitude of $V_2$ is 0, $V_1$ has amplitude +V, as indicated +V$\pi$ in the figure; and when the amplitude of $V_1$ is 0, $V_2$ has amplitude −V as indicated −V$\pi$. When the driving voltages $V_1$ and $V_2$ are in a zone designated by 31 2~−1 and +1~+2 of $\alpha$, $V_1$ and $V_2$ are in-phase with other, that means a phase difference between the driving voltages $V_1$ and $V_2$ is 0, and when $V_1$ and $V_2$ are in a zone designated by −1~−0 and 0~+1 of $\alpha$, $V_1$ and $V_2$ are out-phase from each other, which means a phase difference between the driving voltages $V_1$ and $V_2$ is $\pi$. The former zone is written as "IN-PHASE DRIVE" and the latter zone is written as "OUT-PHASE DRIVE" in FIG. 12A.

As shown in FIG. 11, polarity reverse and amplitude control circuits (POL-REV & AMP-CONTs) (12a and 12b) are connected to the input circuits of the signal electrodes 11a and 11b. The operating points of both side waveguides of the OPT MOD 11 are shifted by reversing the polarity of reference LF SIG ($f_o$) to be sent to PHASE DET & BIAS SUPPs $2_1$ and $2_2$ at a polarity reversing circuit (POL REV) (9), in accordance with OPE POINT SW-SIG. Then, the pre-chirping magnitude for the both side waveguides can be continuously determined by operating the POL-REV & AMP-CONTs 12a and 12b in cooperation with the operating point shift, so as to select predetermined amplitude and phases of the driving signals, respectively.

In the above first, second, third, and fourth embodiments, the change of the pre-chirping magnitude is discussed only when the Mach-Zehnder optical modulator performs intensity modulation. However, in order to changing the pre-chirping magnitude of the Mach-Zehnder optical modulator, there is another method of using phase modulation together with the intensity modulation of the Mach-Zehnder optical modulator. A control unit for carrying out this method will be described in reference with FIG. 13 as a fifth embodiment of the present invention.

In a waveguide type phase modulator generally, the phase shifting magnitude can be controlled by changing the voltage and phase of an electric signal applied to the waveguide type phase modulator. When such a waveguide type phase modulator is used with the Mach-Zehnder optical modulator which performs the intensity modulation, the pre-chirping magnitude can be continuously selected by controlling the amplitude and the phase of the electric signal in cooperation with the switching of the chirping magnitude performed at the Mach-Zehnder optical modulator.

Figure 13:
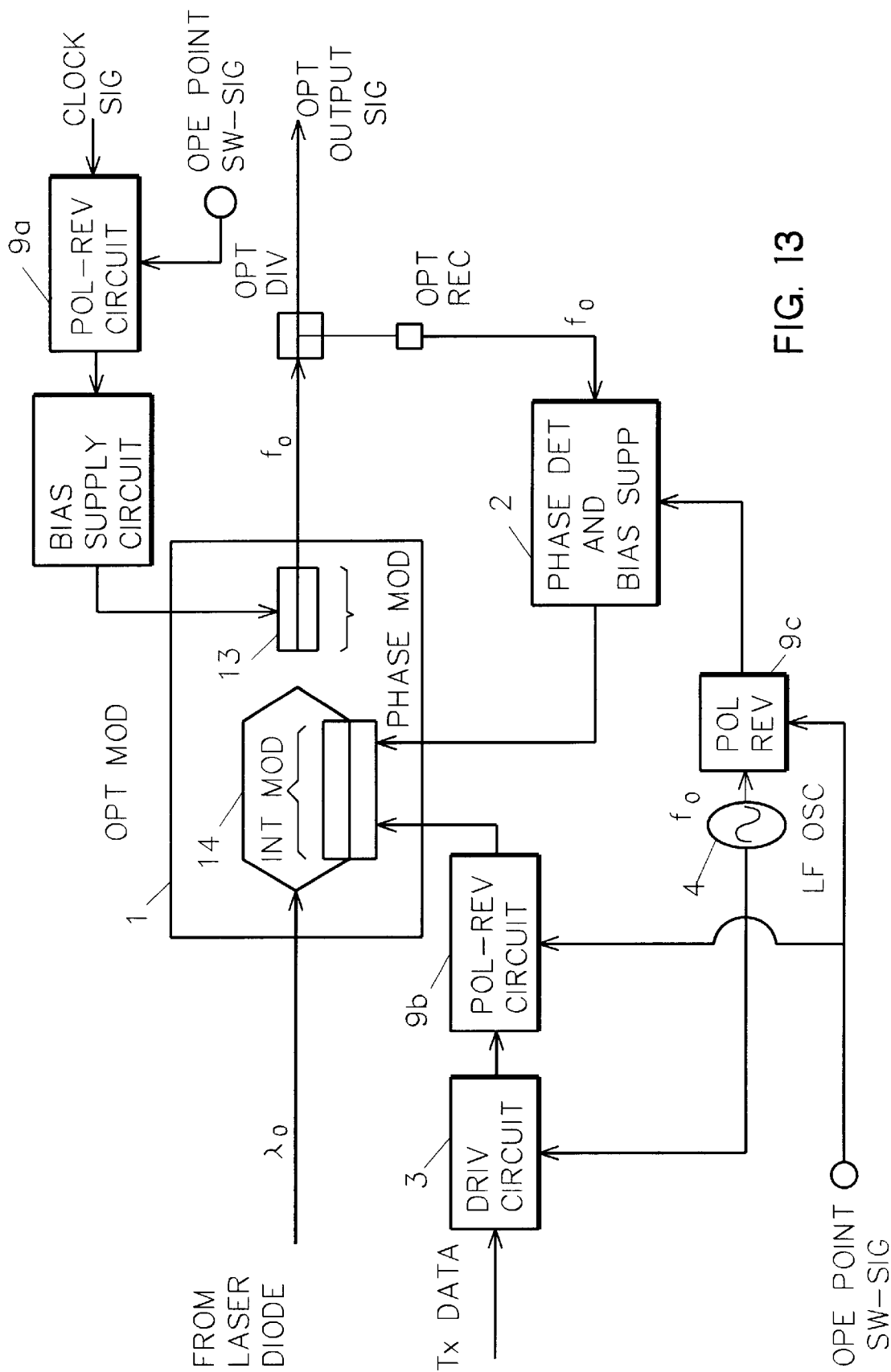
FIG. 13 is a block diagram of an optically modulating apparatus including a control unit of a fifth embodiment of the present invention.

FIG. 13 is a block diagram of an optically modulating apparatus consisting of an OPT MOD (1) including an intensity modulator (INT MOD) (14) and a phase modulator (PHASE MOD) (13) and a control unit for the OPT MOD 1. The control unit concerns the fifth embodiment. The PHASE MOD 13 is positioned after the INT MOD 14 in the path of modulating optical signal in FIG. 13, however, it can be positioned before the INT MOD 14. Since a plurality of this type optical modulators are used for producing the optical output signal under the OTDM or WDM as described in the first to the third embodiments, the operation of this type optical modulator will be discussed by taking up one optical modulator, for describing the fifth embodiment.

In FIG. 13, a clock signal synchronized with a transmitting data signal is sent to the PHASE MOD 13 at which the pre-chirping can be made by changing a phase drift direction in the PHASE MOD 13d individually in the first half and the second half of the optical pulse of the optical output from the INT MOD 14. For instance, when the PHASE MOD 13 is a dielectric waveguide type phase modulator, the chirping magnitude depends on amplitude of the clock signal and when the polarity of the clock signal is reversed, the phase-drift direction in the PHASE MOD 13 is reversed. Therefore, a POL-REV CIRCUIT (9a) is provided on an input circuit of the clock signal for reversing the polarity of the clock signal in cooperation with the operating point shift. By virtue of reversing the polarity of the clock signal thus, the PHASE MOD 13 performs pre-chirping in the same shift direction as the shift direction of chirping in the INT MOD 14, without absolute value of chirping magnitude being affected by a changing direction of chirping due to the operating point shift having been performed at the INT MOD 14. Furthermore, when an amplitude control circuit is provided instead of the POL-REV CIRCUIT 9a, the pre-chirping magnitude can be continuously selected to a required value by controlling the amplitude of the clock signal in the same manner as the POL-REV & AMP CONTs 12a and 12b in FIG. 11.

As stated in the description of the prior art in reference with FIGS. 1 and 2, when modulation is performed by a plurality of optical modulators connected in series and a Mach-Zehnder type modulator is placed at a first stage of the optical modulators for producing a series of the RZ optical pulses, if the operating point is shifted at the first stage Mach-Zehnder type modulator for changing the pre-chirping magnitude, the RZ optical pulses are delayed as much as a half period of a clock signal. As a result, each RZ pulse cannot be positioned at a center of the period of the driving signal, so that a proper waveshape of the optical pulse cannot be obtained from the optical modulators. This problem can be improved by a control unit concerning a sixth embodiment of the present invention.

Figures 14, 14A:
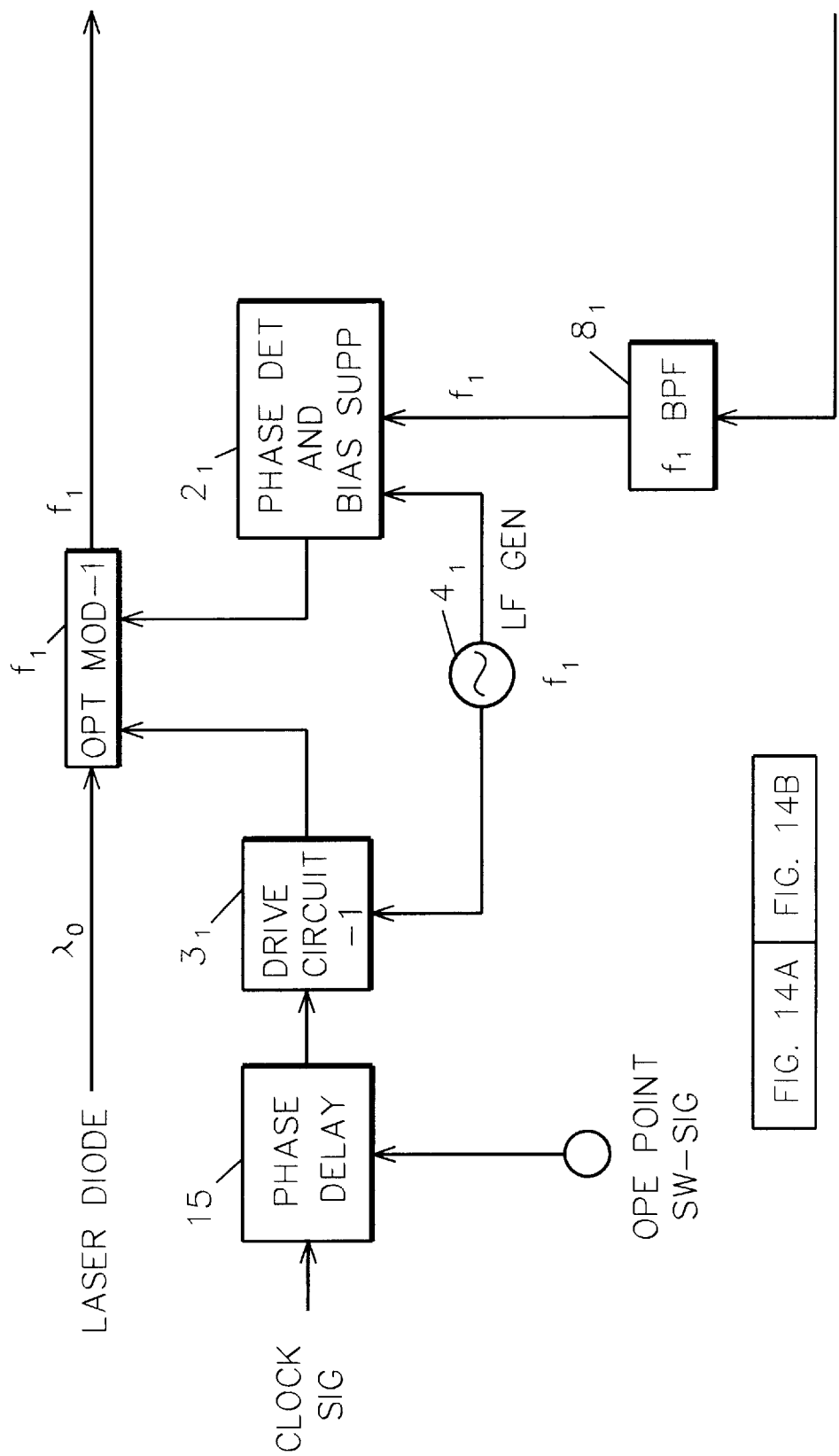
FIG. 14 is a block diagram of an optically modulating apparatus including a control unit of a sixth embodiment of the present invention.
Figure 14B:
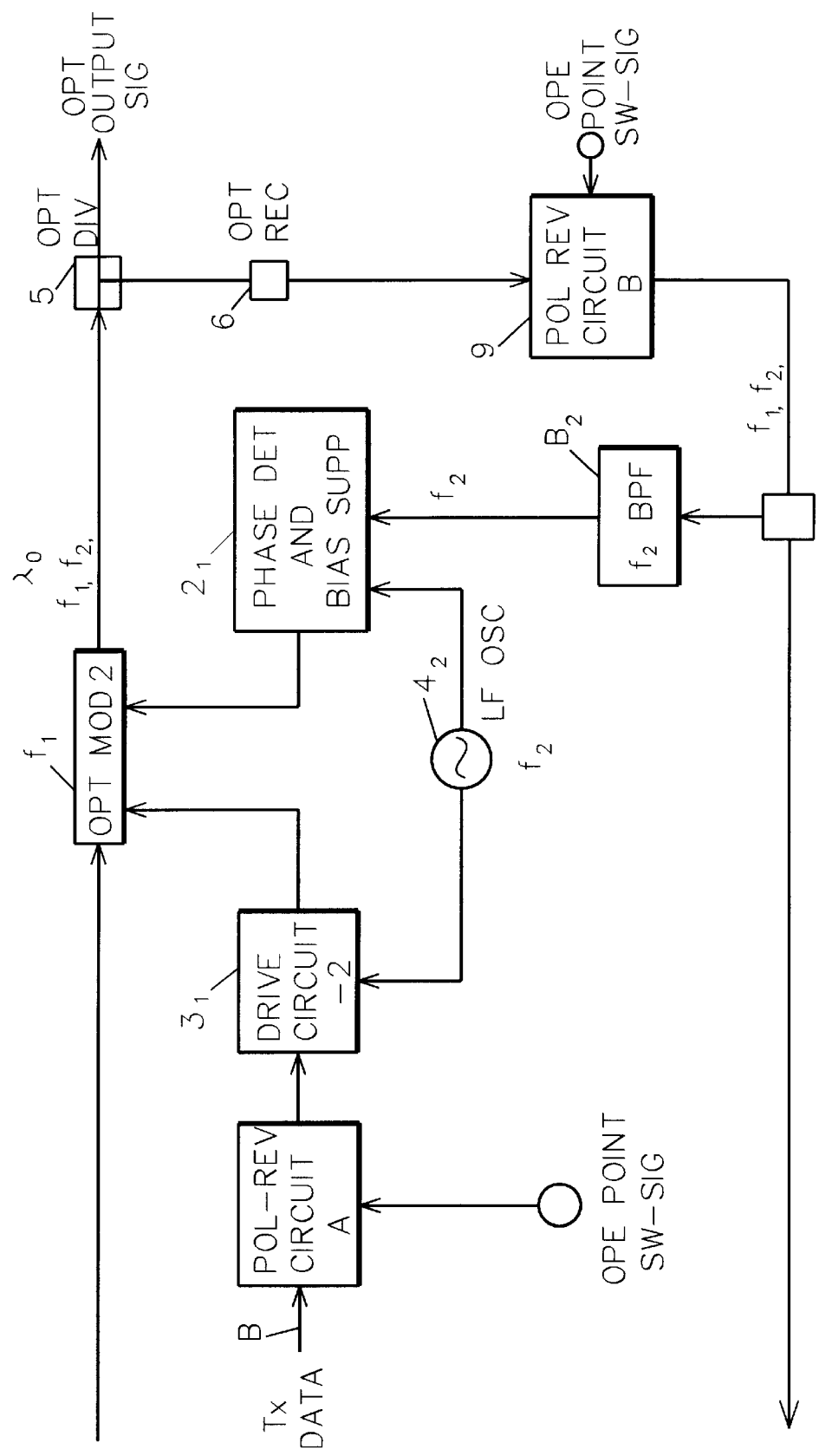

FIG. 14 is a block diagram of an optically modulating apparatus including the control unit concerning the sixth embodiment. In FIG. 14, a Mach-Zehnder type optical modulator 1 (OPT MOD-1) ($1_1$) performs optical modulation for producing a series of RZ pulses from laser light in accordance with a clock signal given to the OPT MOD-1 $1_1$ through a phase delay circuit (PHASE DELAY) (15) and a driving circuit 1 (DRIVE CIRCUIT-1) ($3_1$). The PHASE DELAY 15 operates in accordance with an OPE POINT SW-SIG, for shifting a phase of the clock signal as much as a half period of the clock signal. By virtue of the PHASE DELAY 15, the driving signal can be shifted so as to make a phase of the optical output from the OPT MOD-1 $1_1$ equal to that from the latter modulator (OPT MOD-2) ($1_2$). As a result, the optical pulse waveshape can be kept to the same as the optical pulse waveshape obtained before changing the chirping magnitude. In the above description, a POL-REV CIRCUIT can be used instead of the PHASE DELAY 15 and the PHASE DELAY 15 can be placed on an input circuit (E) for supplying Tx DATA of the OPT MOD-2 $1_2$.

Figure 15B:
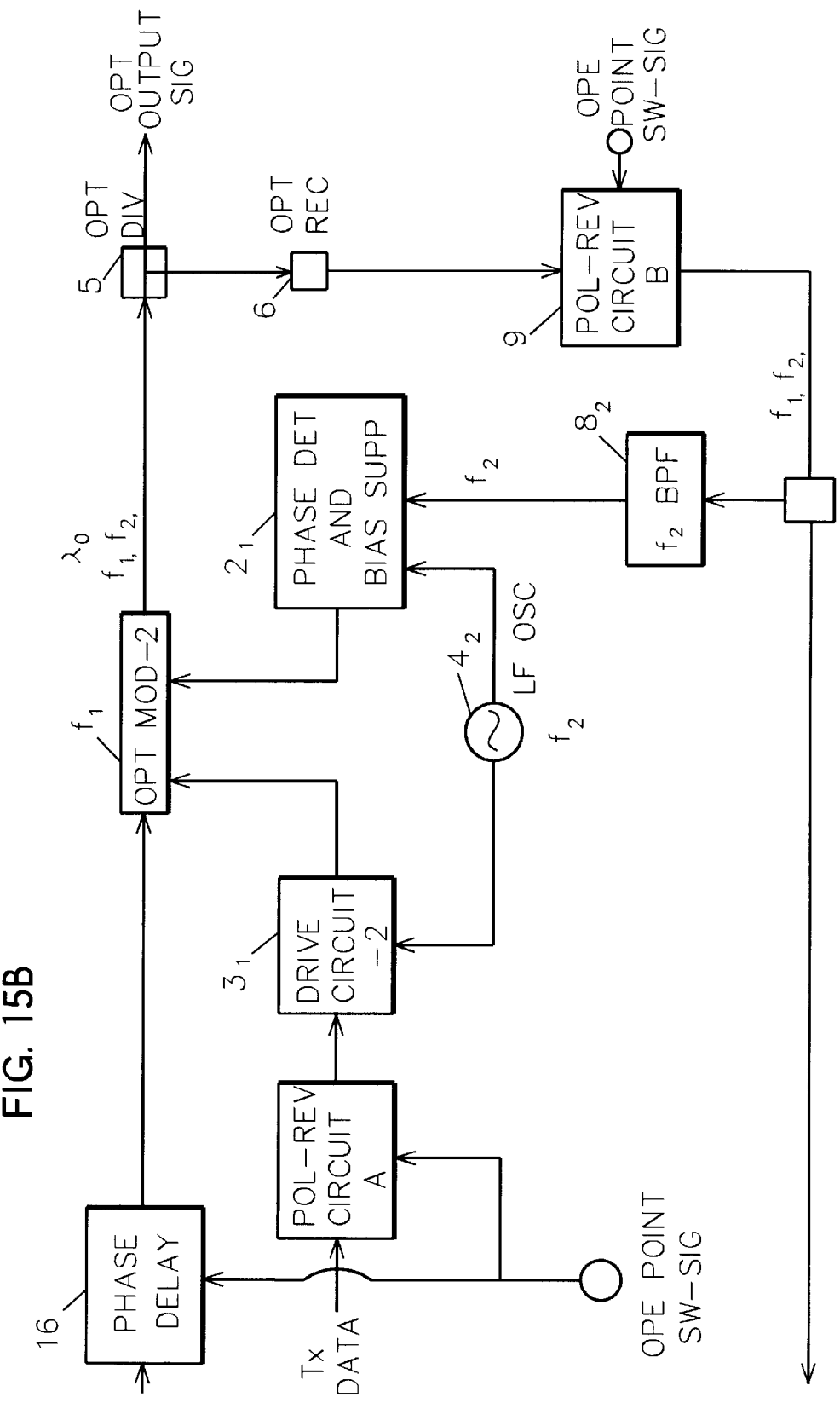
FIG. 15 is a block diagram of an optically modulating apparatus including a control unit of a seventh embodiment of the present invention.

Furthermore, in order to improve the problem described above in reference with FIG. 14, a PHASE DELAY (16) can be added on an optical path between the OPT MOD-1 $1_1$ and the OPT MOD-2 $1_2$ as shown in FIG. 15. Because, lengthening the optical pass by the PHASE DELAY 16 is the same as delaying the clock signal optically, which results in performing the same improvement as in FIG. 14. FIG. 15 is a block diagram of an optically modulating apparatus including a control unit concerning a seventh embodiment of the present invention.

In the optically modulating apparatus described in the first to seventh embodiments, when optical modulators serving the pre-chirping is limited in number, it is enough to change the chirping coefficients of the limited optical modulators and it is effective to change only the chirping coefficients of the limited optical modulators. For example, when a plurality of optical modulators are used in the optically modulating apparatus and one optical modulator performs modulation in accordance with a clock signal, the rising and falling characteristics of the optical pulses in the optical output signal of the apparatus are determined by the performance of the limited optical modulator. Therefore, in such optically modulating apparatus, a pre-chirping magnitude required to change for compensating the optical output signal is nothing but the pre-chirping magnitude required to change in the limited optical modulator. As a result, it is enough and effective to change the pre-chirping magnitude only at the limited optical modulator concerning the clock signal.

The optically modulating apparatus shown in FIG. 1 is a typical example for discussing the limited optical modulator. The apparatus performs optical modulation under the OTDM, using three optical modulators partially in series and parallel.

Figures 16, 16A:
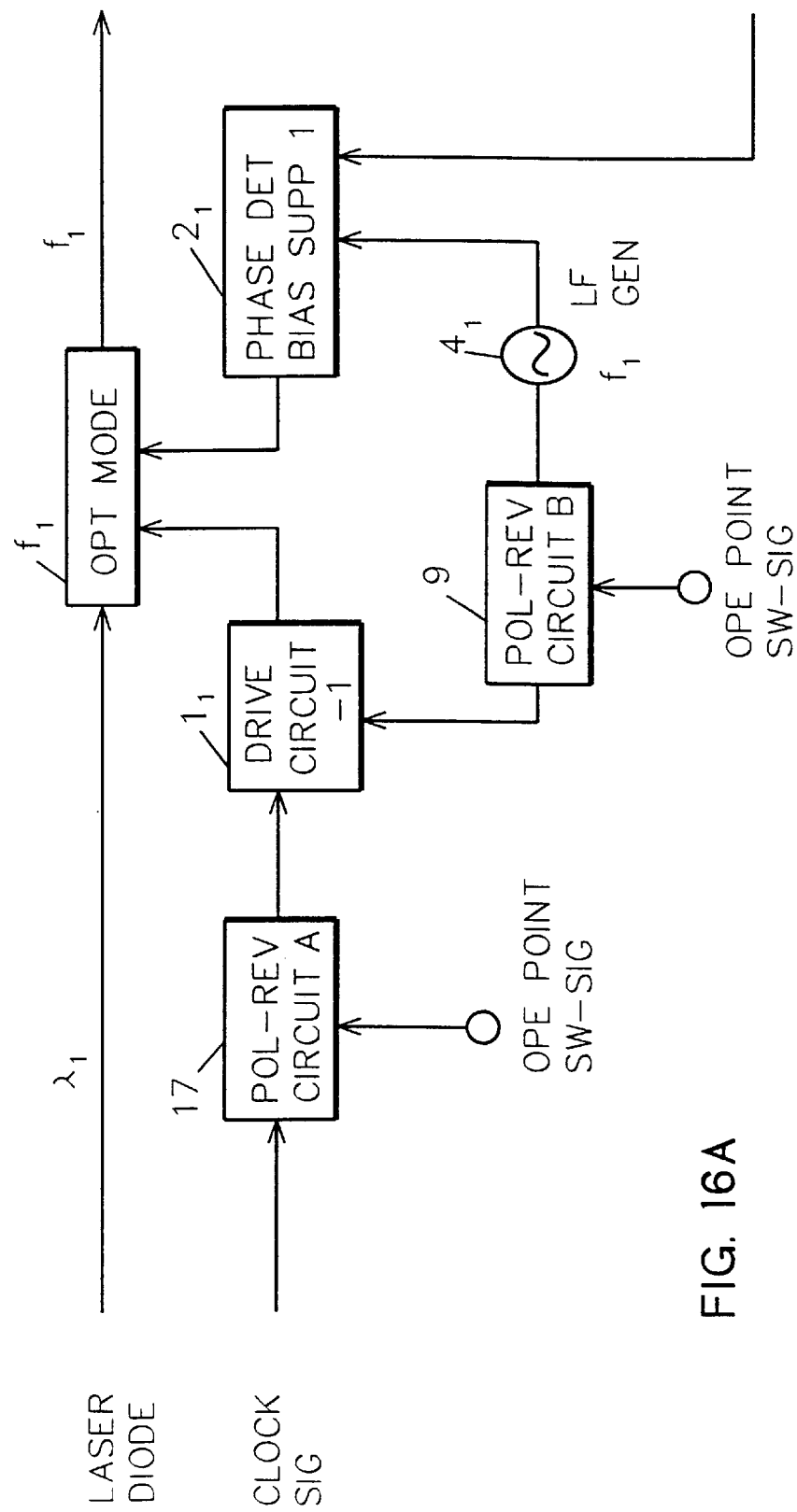
FIG. 16 is a block diagram of an optically modulating apparatus including a control unit of an eighth embodiment of the present invention.
Figure 16B:
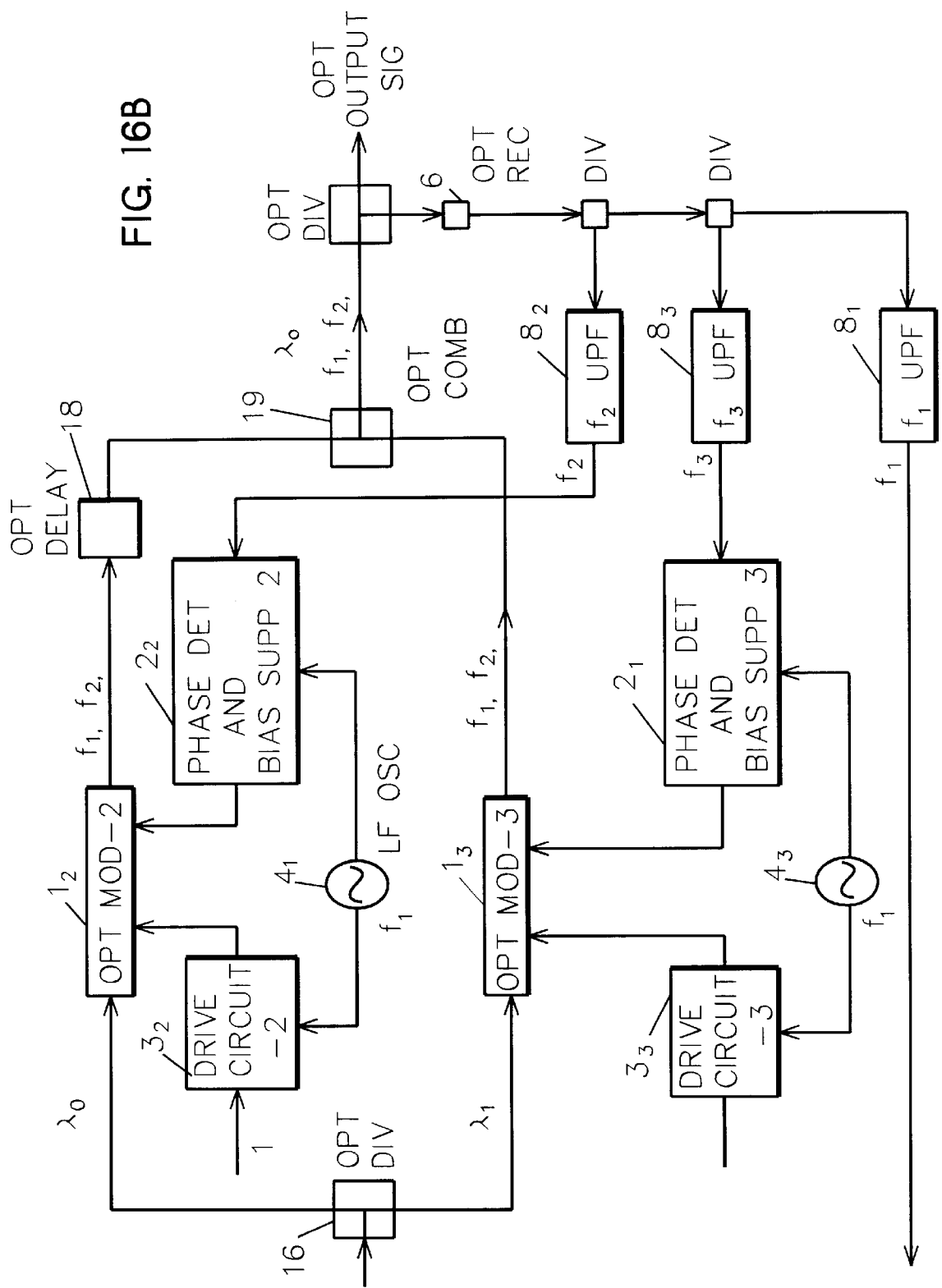

FIG. 16 is a block diagram of an optically modulating apparatus including the optical modulators the same as in FIG. 1 and a control unit for the optical modulators. The control unit concerns an eighth embodiment of the present invention.

In FIG. 16, an OPT MOD-1 ($1_1$) modulates laser light having wave length $\lambda_o$ into a series of RZ clock optical pulses by a clock signal at a half rate of a transmitting data rate; an OPT DIV (16) divides power of the RZ clock optical pulses from the OPT MOD-1 $1_1$, in half; and an OPT MOD-2 ($1_2$) and an OPT MOD-3 ($1_3$) modulate the half power RZ clock optical pulses into optical output by transmitting data 1 and 1, respectively; an optically delaying element (OPT DELAY) (18) delays the optical output from the OPT MOD-2 $1_2$ as much as a half of the clock signal interval in comparison with the optical output from the OPT MOD-3 $1_3$; and an optical output combiner (OPT COMB) (19) combines the optical output delayed at the OPT DELAY 18 and the optical output of the OPT MOD-3 $1_3$ into an OTDM optical output signal consisting of 2 channels having wave length $\lambda o$.

In the optically modulating apparatus in FIG. 16, since the wavelength of the optical output signal depends on the chirping coefficient of the OPT MOD-1 $1_1$, the wavelength is controlled only by changing the chirping quantity of the OPT MOD-1 $1_1$. The chirping magnitude is changed by shifting the optical point of the OPT MOD-1 $1_1$ under control of a POL-REV CIRCUIT-B (9) operating in accordance with an OPE POINT SW-SIG, and at the same time, the polarity of the clock signal is reversed at a POL-REV CIRCUIT-A (17). In other OPT MOD-2 $1_2$ and OPT MOD-3 $1_3$, the drift compensation of the operating point is performed independently by using superposed LF $f_2$ and LF $f_3$ respectively. However, since the drift compensation does not contribute the change of the chirping magnitude, the OPT MOD-2 $1_2$ and OPT MOD-3 $1_3$ have no control circuit for shifting their operating points. By virtue of the above constitution, there is no trouble that the polarity of the optical output signal is changed because of the operating point shift, and the pre-chirping magnitude to be added to the optical output signal can be changed effectively.

What is claimed is:

1. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators.

2. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators; and wherein the optically modulating apparatus includes a plurality of optical modulators arranged in a parallel configuration for producing optical outputs respectively at a different time slot from each other with the same wavelength and produces an optical output signal of the apparatus by combining the optical outputs, wherein said pre-chirping change circuit changes the pre-chirping magnitude in all of the optical modulators.

3. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators;

wherein the optically modulating apparatus includes two optical modulators arranged in series, a first stage optical modulator producing a series of optical pulses at a transmitting rate of the optical output signal and a second stage optical modulator performing optical modulation in accordance with transmitting data, wherein said pre-chirping change circuit changes the pre-chirping magnitude in the optical modulator producing a series of optical pulses.

4. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; said said pre-chirping circuit including means for keeping the optical output signal produced by the optical modulating apparatus the same as before changing the pre-chirping magnitude of the optical modulators;

wherein the optically modulating apparatus includes a plurality of optical modulators arranged in a parallel configuration for producing optical outputs respectively at different wavelengths from each other and produces an optical output signal of the apparatus by combining the optical outputs, said optical modulators being separated in groups so that each group produces an optical output with a limited range of wavelengths at which deterioration of optical pulse occurs due to characteristics of an optical data transmission line for transmitting the optical output signal, wherein said pre-chirping change circuit changes pre-chirping magnitude of all the optical modulators simultaneously in each group and independently between the groups.

5. A control unit according to claim 4, wherein said pre-chirping change circuit changes pre-chirping magnitude of two groups respectively, a group producing an optical output at wavelengths equal to or longer than a zero dispersion wavelength and another group producing optical output at wavelengths shorter than the zero dispersion wavelength.

6. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators;

the optical modulators are Mach-Zehnder type optical modulators, wherein said pre-chirping changes the pre-chirping magnitude by shifting operating points of the Mach-Zehnder type optical modulators.

7. A control unit according to claim 6, wherein said pre-chirping change circuit changes the pre-chirping magnitude by the shift of the operating points of the Mach-Zehnder type optical modulators in cooperation with reversing a polarity of driving signals for the Mach-Zehnder type optical modulators.

8. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators;

wherein the optical modulators are Mach-Zehnder type optical modulators, each including two branches of a waveguide having a signal electrode respectively, the chirping magnitude is added to the Mach-Zehnder type optical modulators by varying a modulation ratio of the Mach-Zehnder type optical modulators in keeping a different of phase shift amount between the signal electrodes to a predetermined value, wherein said pre-chirping change circuit changes the pre-chirping magnitude by varying an amplitude and polarity of the driving signals in cooperation with performing a point shift to the Mach-Zehnder type optical modulators.

9. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude of the optical modulators;

wherein the optically modulating apparatus includes a Mach-Zehnder type optical modulator for performing light intensity modulation and an optical phase modulator connected with the Mach-Zehnder type optical modulator in series for providing phase variation in opposite directions respectively to a rising and a falling portion of each optical pulse, wherein said pre-chirping change circuit changes the pre-chirping magnitude continuously in correspondence with characteristics of a transmission line connected with the apparatus, by reversing a polarity of a driving signal to the optical phase modulator and changing an amplitude of the driving signal in correspondence with a shift of an operating point of the Mach-Zehnder type optical modulator.

10. A control unit in an optical modulating apparatus including a plurality of optical modulators producing an optical output signal which includes a series of optical pulses, for controlling the apparatus so as to perform pre-chirping thereto by changing optical wavelengths in the optical pulses, said control unit comprising:

a pre-chirping circuit for changing a pre-chirping magnitude of the optical modulators, wherein the optical modulating apparatus a connected with said pre-chirping circuit; and said pre-chirping circuit including means for keeping the optical output signal produced by the optical modulating apparatus the same as before changing the pre-chirping magnitude of the optical modulators;

wherein the optically modulating apparatus includes a Mach-Zehnder type optical modulator which performs modulation in accordance with a clock signal having a half frequency of a bit rate of an optical output signal of the apparatus and produces a series of RZ pulses, and an optical modulator connected to the Mach-Zehnder type optical modulator in series and modulates the RZ pulses with a data signal for producing the optical output signal, wherein said pre-chirping change circuit changes the pre-chirping magnitude by shifting an operating point of the Mach-Zehnder type optical modulator and, at the same time, shifting the phase difference between the data signal and the RZ pulse as much as a half interval of the clock signal.

11. A control unit in an optical modulating apparatus including a plurality of optical modulators producing an optical output signal which includes a series of optical pulses, for controlling the apparatus so as to perform pro-chirping thereto by changing optical wavelengths in the optical pulses, said control unit comprising:

a pre-chirping circuit for changing a pre-chirping magnitude of the optical modulators, wherein the optical modulating apparatus is connected with said pre-chirping circuit; and said pre-chirping circuit including means for keeping the optical output signal produced by the optical modulating apparatus the same as before changing the pre-chirping magnitude or the optical modulators;

wherein the optically modulating apparatus includes a plurality of modulators consisting of a first stage optical modulator for producing a series of RZ pulses in accordance with a clock signal and dividing RZ pulses, and optical modulators for producing optical output by modulating the divided RZ pulses respectively in accordance with independent data signals, and an optical signal combiner which combines the optical output of the modulators and produces an optical output signal of the apparatus, wherein said pre-chirping change circuit changes the pre-chirping magnitude by controlling only the first stage modulator together with reversing a polarity of the clock signal added to the first stage optical modulator.

* * * * *